US011441612B1

(12) United States Patent
Waltz

(10) Patent No.: US 11,441,612 B1
(45) Date of Patent: Sep. 13, 2022

(54) MULTI-SPEED ELECTRIC POWERTRAIN WITH STEPPED SPLINES THAT ALLOW ADDITIONAL DEGREES OF FREEDOM

(71) Applicant: Dana Heavy Vehicle Systems Group, LLC, Maumee, OH (US)

(72) Inventor: William F. Waltz, Toledo, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 17/315,070

(22) Filed: May 7, 2021

(51) Int. Cl.
| | |
|---|---|
| *F16D 11/10* | (2006.01) |
| *B60K 17/02* | (2006.01) |
| *F16H 57/08* | (2006.01) |
| *F16D 11/00* | (2006.01) |
| *F16D 11/14* | (2006.01) |
| *B60K 17/08* | (2006.01) |
| *B60K 1/00* | (2006.01) |

(52) U.S. Cl.
CPC ............. *F16D 11/10* (2013.01); *B60K 17/02* (2013.01); *F16D 11/00* (2013.01); *F16D 11/14* (2013.01); *F16H 57/08* (2013.01); *B60K 17/08* (2013.01); *B60K 2001/001* (2013.01); *B60Y 2400/421* (2013.01); *B60Y 2400/73* (2013.01); *F16D 2011/002* (2013.01); *F16D 2011/004* (2013.01); *F16D 2011/008* (2013.01); *F16H 2200/2005* (2013.01); *F16H 2200/2094* (2013.01)

(58) Field of Classification Search
CPC ........ F16D 1/0876; F16D 11/14; F16D 10/10; F16B 2200/10
See application file for complete search history.

(56) References Cited

U.S. PATENT DOCUMENTS

| 4,063,470 A | 12/1977 | Kelbel | |
|---|---|---|---|
| 4,189,960 A * | 2/1980 | Holdeman | ................ F16H 3/54 475/298 |
| 5,613,587 A | 3/1997 | Baxter, Jr. | |
| 5,954,612 A | 9/1999 | Baxter, Jr. | |
| 7,479,084 B2 * | 1/2009 | Alfredsson | ........... F16H 37/046 475/209 |
| 2006/0213746 A1 * | 9/2006 | Nakagomi | ............... B21H 1/18 192/70.2 |

FOREIGN PATENT DOCUMENTS

| JP | H07-000737 Y2 * | 1/1995 |
|---|---|---|
| WO | 2008058812 A1 | 5/2008 |

* cited by examiner

*Primary Examiner* — Stacey A Fluhart
(74) *Attorney, Agent, or Firm* — McCoy Russell LLP

(57) ABSTRACT

Various methods and systems are provided for a multi-speed electric axle assembly. The multi-speed electric axle assembly includes a grounding plate with an outer interface coupled to a housing interface and an inner stepped splined interface designed to selectively mate with a clutch sleeve. In the assembly, the inner stepped splined interface includes a plurality of steps that each include a first side that perpendicularly intersects a second side and the first side of each step in the inner stepped splined interface includes a clearance between the first side and a stepped surface of the clutch sleeve.

19 Claims, 17 Drawing Sheets

| Sliding Sleeve DOF | Degrees of Freedom (DOF) | | | | | |
|---|---|---|---|---|---|---|
| | Axial Displacement (x-axis) | Axial Displacement (z-axis) | Vertical Displacement (y-axis) | Torsion Reaction (about x-axis) | Binding Moment (about y-axis) | Binding Moment (about z-axis) |
| 1310 Involute Splines at OD Sleeve & at OD Grounding Plate (Prior Art) | | X | X | x | X | X |
| 1320 Vertical Steps at OD Sleeve & Involute Splines at OD Grounding Plate | | X | | x | X | |
| 1330 Horizontal Steps at OD Grounding Plate & Involute Splines at OD Sleeve | | | X | x | | X |
| 1340 Vertical Steps at OD Sleeve & Horizontal Steps at OD Grounding Plate with Grounding Plate Retaining Rings | | | | x | x | | x = Restricted
X = Over-constrained

MULTI-SPEED ELECTRIC POWERTRAIN WITH STEPPED SPLINES THAT ALLOW ADDITIONAL DEGREES OF FREEDOM

TECHNICAL FIELD

The present disclosure relates to a multi-speed electric powertrain with a transmission having a grounding plate.

BACKGROUND AND SUMMARY

Many electric powertrains include single speed transmissions that mechanically attach to a motor. Due to the single gear ratio, the powertrains are forced to make tradeoffs between off the line acceleration and top speed. To diminish the extent of these unwanted tradeoffs, multi-speed gearboxes have been provided for operating the powertrain in discrete gear ratios. Because of the gear ratio adjustability, the motor may be operated within a desired speed/torque range to increase motor efficiency and operational range, for example.

Certain transmissions have made use of epicyclic gears that compactly provide discrete gear reductions. To adjust the gear ratio of these transmissions, one of the epicyclic gears may be mechanically grounded to inhibit gear rotation. The shifting components may experience binding during certain conditions. The inventor has found that in some transmissions the binding is caused by the over-constraint of the shifting components. For instance, tilt of a sliding sleeve in a dog clutch and the positional tolerance stack-up of the shifting components may lead to sleeve jamming which hampers the sleeve's ability to axially translate. The inventor has identified an unmet need to strategically increase selected degrees of freedom of the clutch sleeve to prevent binding while providing durable sleeve grounding functionality.

The inventor has recognized the aforementioned issues with previous electric powertrains and developed a multi-speed electric powertrain system that includes a grounding plate with an outer interface coupled to a housing interface, in one example. In this example, the grounding plate includes an inner stepped splined interface designed to selectively mate with a clutch sleeve. Further, the inner stepped splined interface includes a plurality of steps that each include a first side that perpendicularly intersects a second side. Even further, the second side of each step in the inner stepped splined interface includes a vertical clearance between the second side and a stepped surface of the clutch sleeve. Further, in one example, the outer interface may also be a stepped splined interface with a horizontal clearance between the sides of the steps. In this way, the stepped spline interfaces accommodate for some vertical and, in certain cases horizontal, movement and tilt of the sliding sleeve in the corresponding plane, which permits the clutch sleeve to find its equilibrium with respect to the grounding plate to reduce the chance of binding. Further, the inclusion of multiple vertical, and in some cases horizontal, steps may allow a torque reaction load that is transferred between the splined interfaces to be dispersed over greater contact areas to reduce stress occurring at any given contact point. Consequently, the likelihood of grounding plate, clutch sleeve, and/or housing degradation is reduced, thereby increasing the system's longevity.

As one example, the first side of the steps of the grounding plate or the clutch sleeve may include a curved profile, such as an elliptical or involute shape. Further, in some cases, both the steps in the grounding plate and the clutch sleeve may include a curved profile. In this way, edge loading, which may result when the clutch sleeve mates with the inner stepped splined interface is under a torque load, may be reduced. In another example, the plurality of steps may have varying widths, which may allow for desired load distribution in the grounding plate.

In another example, the multi-speed electric powertrain system may further include a shoe. The shoe has a flat surface adjacent to a stepped surface in the outer or inner splined interface as well as a convex surface mated in a concave receptacle. In this way, the shoe may be used as an additional tool for reducing edge loading and contact stress.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 13 shows a table depicting restricted and over-constrained degrees of freedom which may result from various stepped interface arrangements described herein, in use-case examples.

FIGS. 2-12 are drawn approximately to scale. However, other relative component dimensions may be used, in other embodiments.

DETAILED DESCRIPTION

In some electric vehicle (EV) systems, the powertrain utilizes clutch units that include a sliding shift sleeve and an inner hub to ground one or more gears in a transmission, to operate the vehicle in a variety of different gear ratios. The shift sleeve may have concentric splines engaging a grounding plate. The shift sleeve may transmit torque transferred from one or more gears in the transmission to the grounding plate, the torque being transmitted in a plane normal to the axis of translation. In these systems, the shift sleeve may experience binding issues due to the radial positional tolerance stack-up within the shifting assembly, gravitational effects, and/or tilting of the shift sleeve during operation, which may hinder the ability of the sleeve to translate axially. For instance, the shift sleeve may become jammed, or pinched, between the inner hub and the grounding plate in a vertical plane when the outer and/or inner diameter splines present over-constraints.

A transmission system is described herein that at least partially addresses the over-constraint issues of previous transmissions. The transmission system includes a clutch shift sleeve with outer and inner diameter splines, at least one of which may include stepped vertical or horizontal flanks. The stepped spline configuration reduces over-constraints, particularly those which restrict movement of the clutch shift sleeve in a vertical direction and restrict rotation (e.g., tilting) of the clutch shift sleeve in a vertical plane, to allow for some vertical movement and a small amount of tilting of the clutch sleeve. Further, in some cases, the splines may be designed to allow axial translation and the transmission of torque from a gear component to a grounding plate, and to resist horizontal movement normal to a translation axis and rotational movement in a horizontal plane. In this way, the ability of the clutch shift sleeve to translate axially may be increased, while maintaining some restriction of axial and rotational movement of the clutch shift sleeve, to avoid binding issues that may arise from excessive tilting and/or gravitational effects combined with radial positional tolerance.

Figure 1:
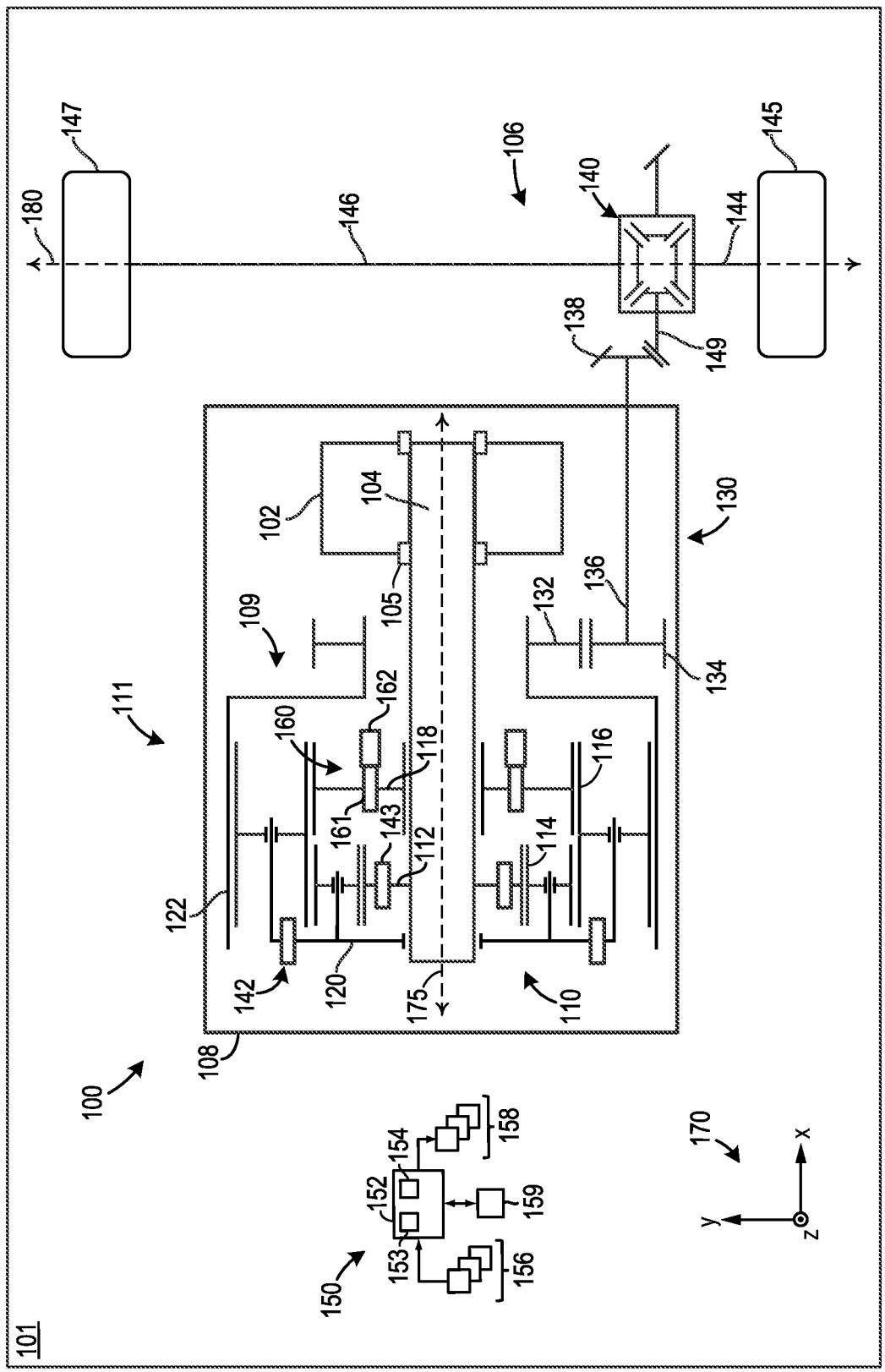
FIG. 1 is a schematic representation of a vehicle system with a powertrain.
Figure 2:
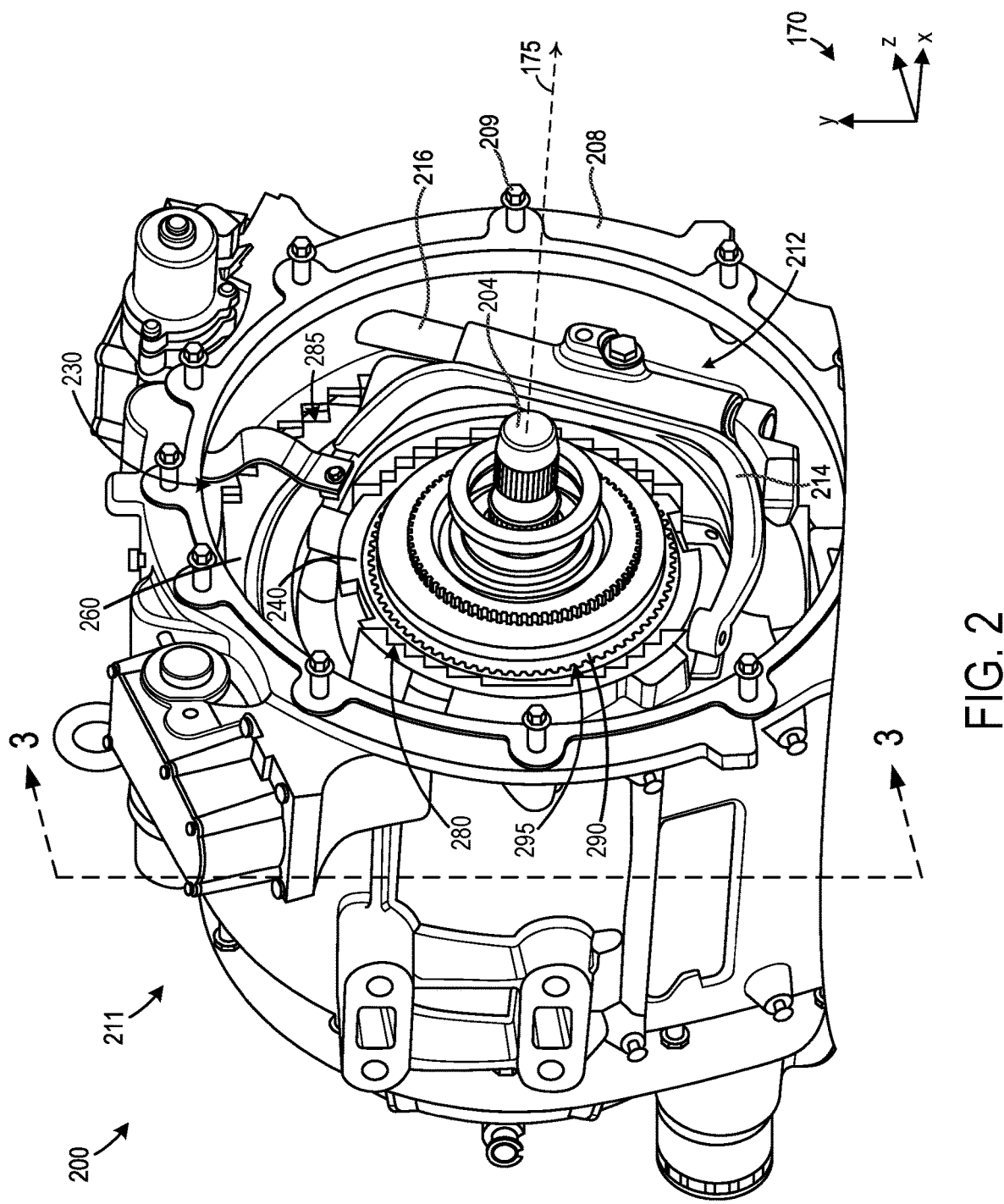
FIG. 2 is a perspective cut-away view of a transmission of the powertrain with a grounding plate and a clutch sleeve, in a first example.
Figure 5A:
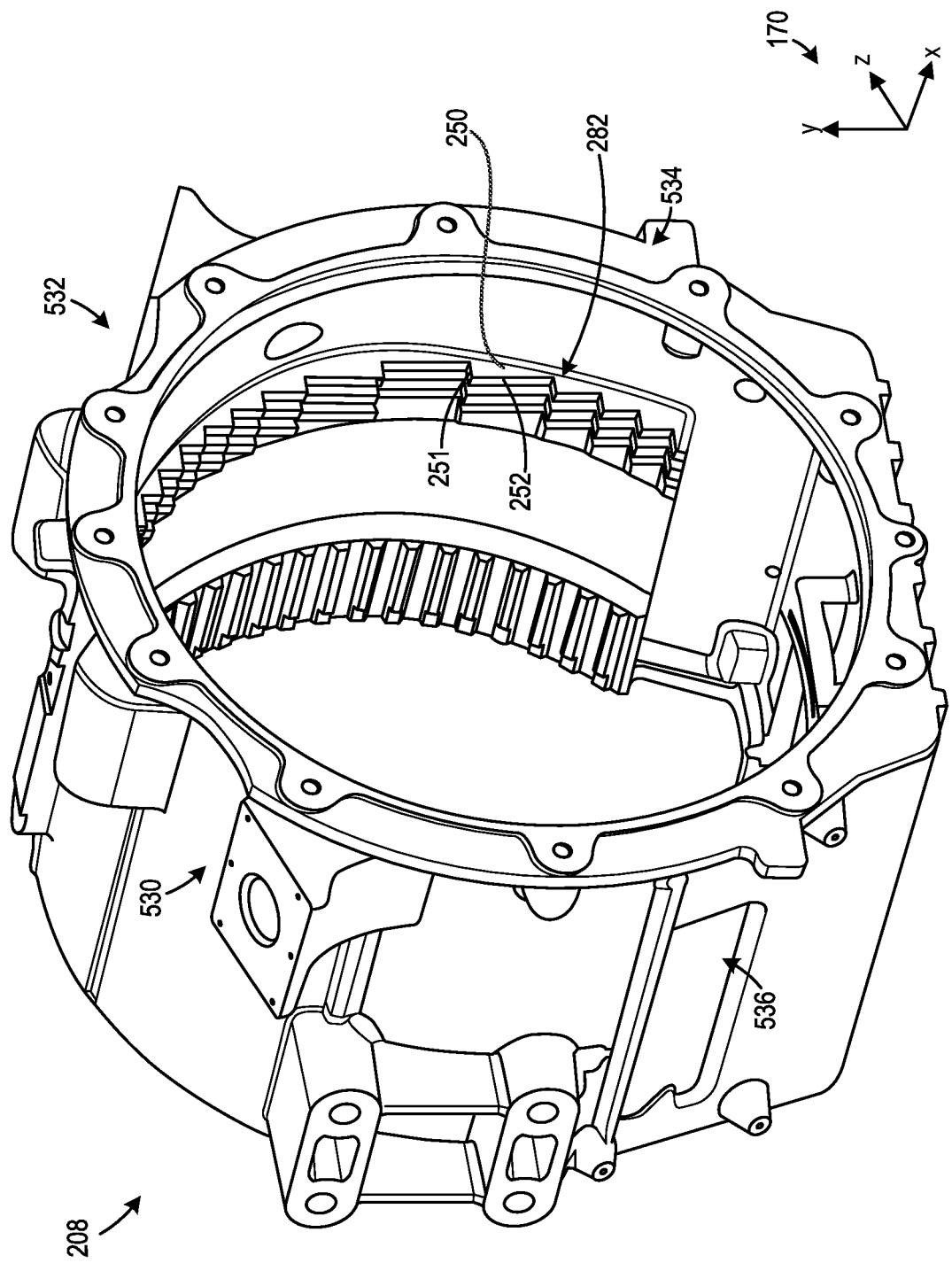
FIGS. 5A-5C show detailed views of the housing, grounding plate, and clutch sleeve, respectively, depicted in FIG. 2.
Figure 5B:
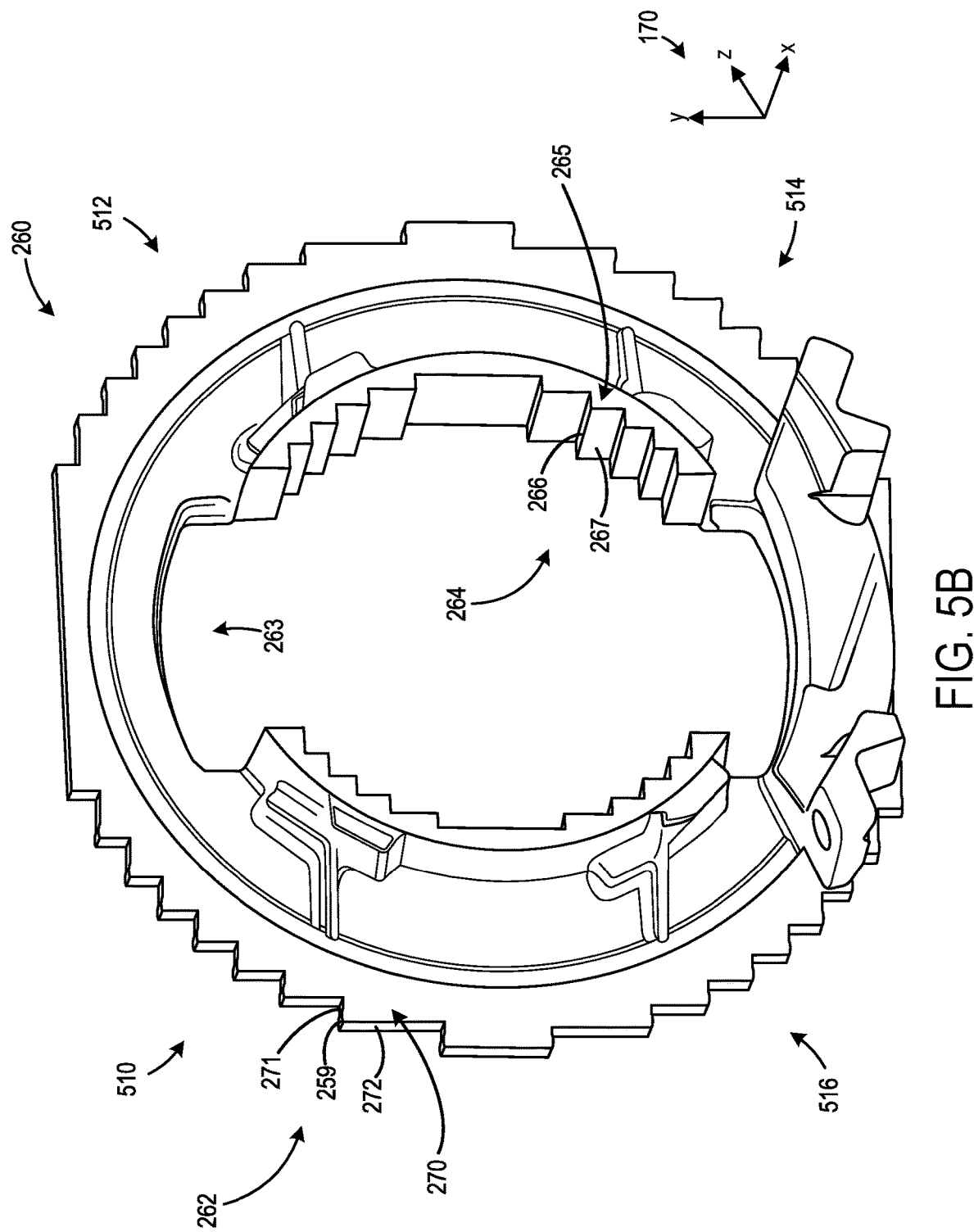
Figure 5C:
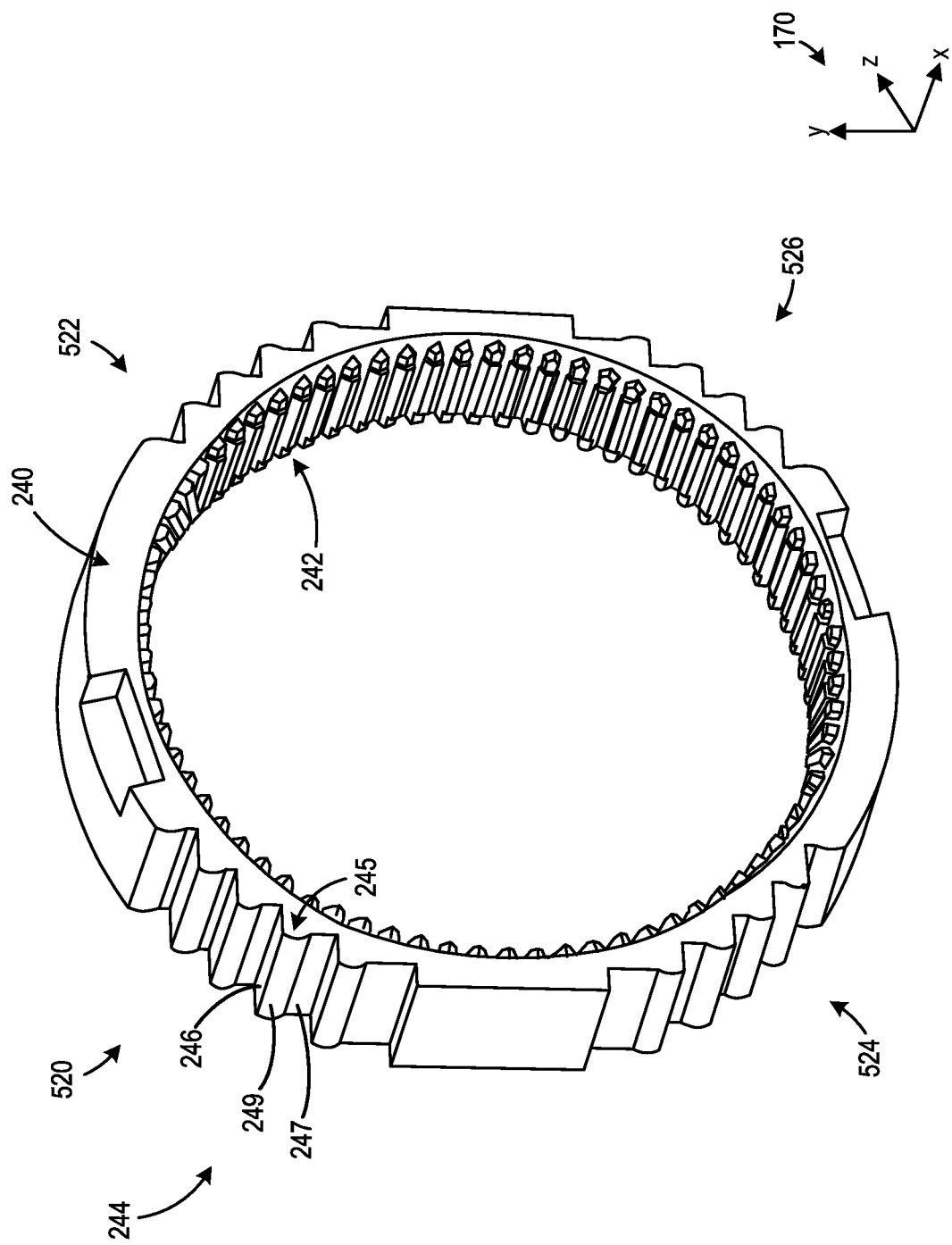
Figure 6:
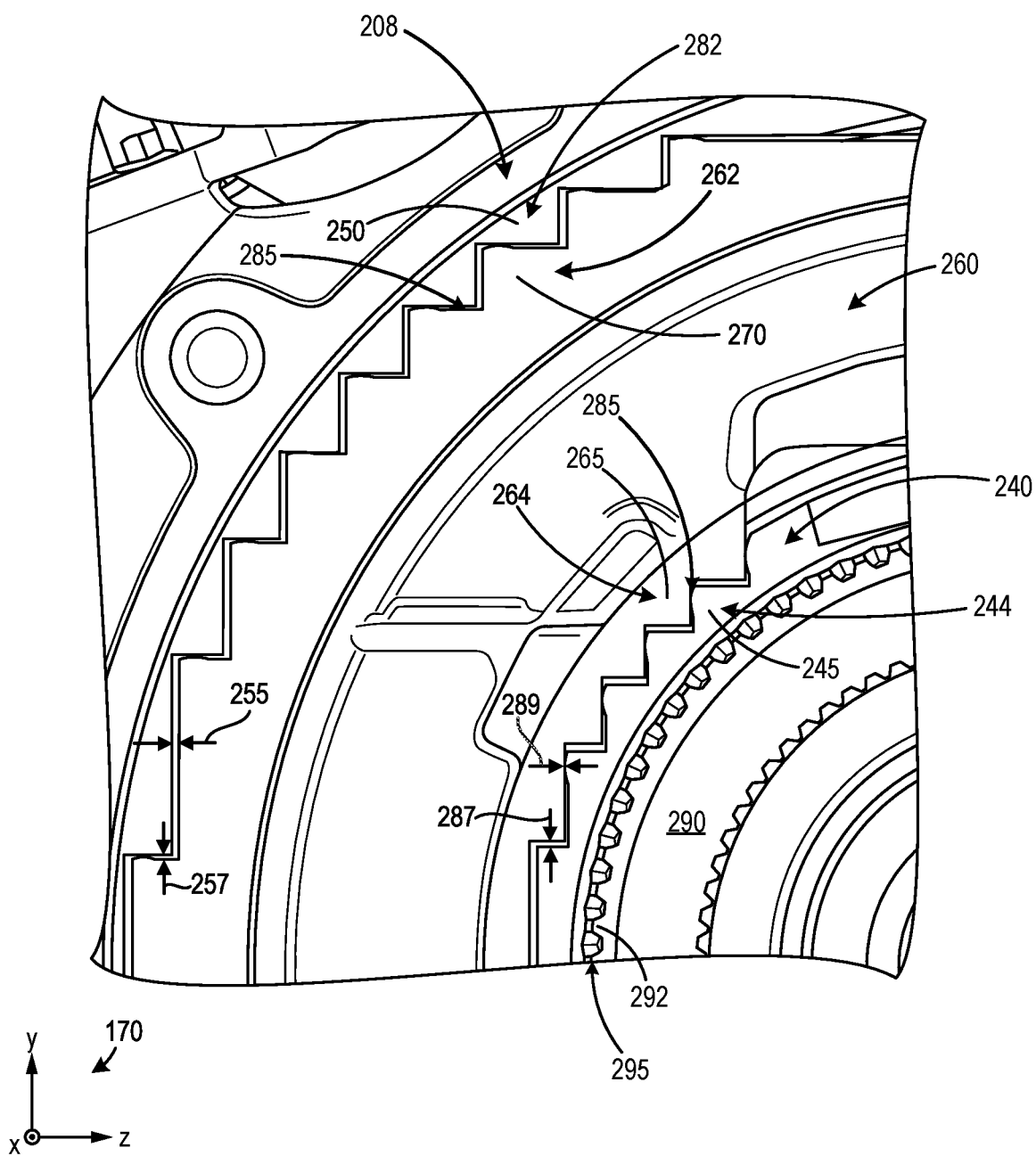
FIG. 6 shows a detail view of stepped interfaces formed between the housing, grounding plate, and clutch sleeve, in the transmission, depicted in FIG. 2.
Figure 7B:
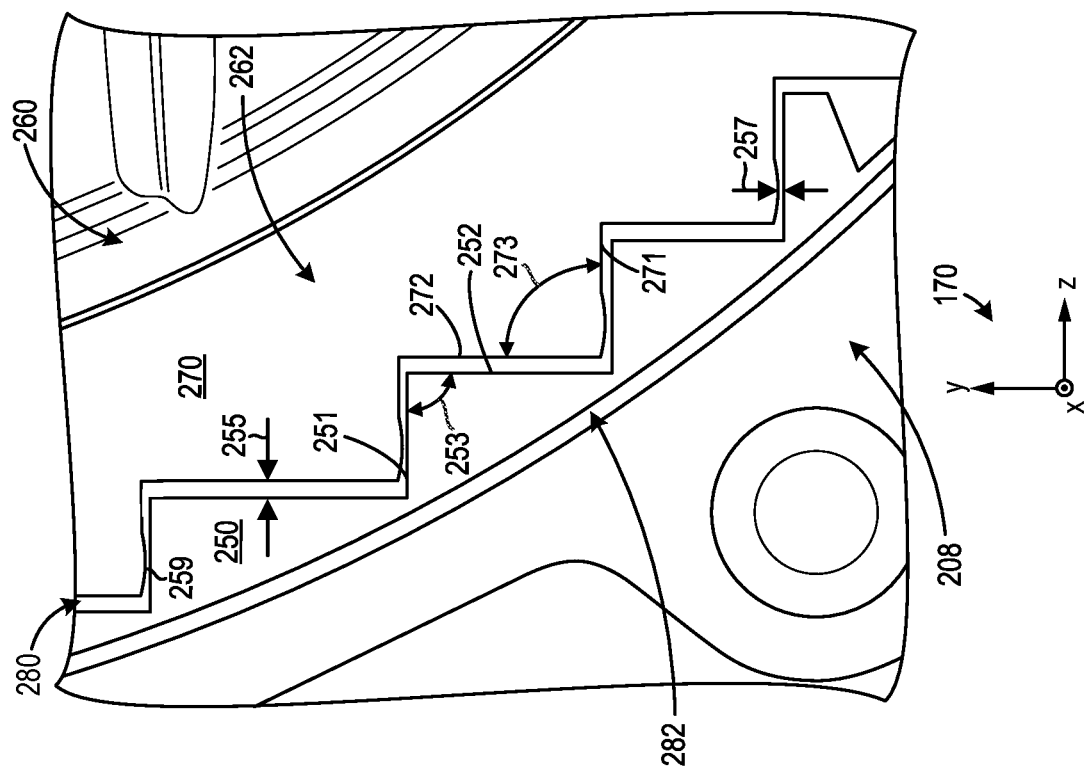
FIGS. 7A-7B show more detailed views of the stepped interfaces formed between the housing and the grounding plate, between the grounding plate and the clutch sleeve, respectively.
Figure 9:
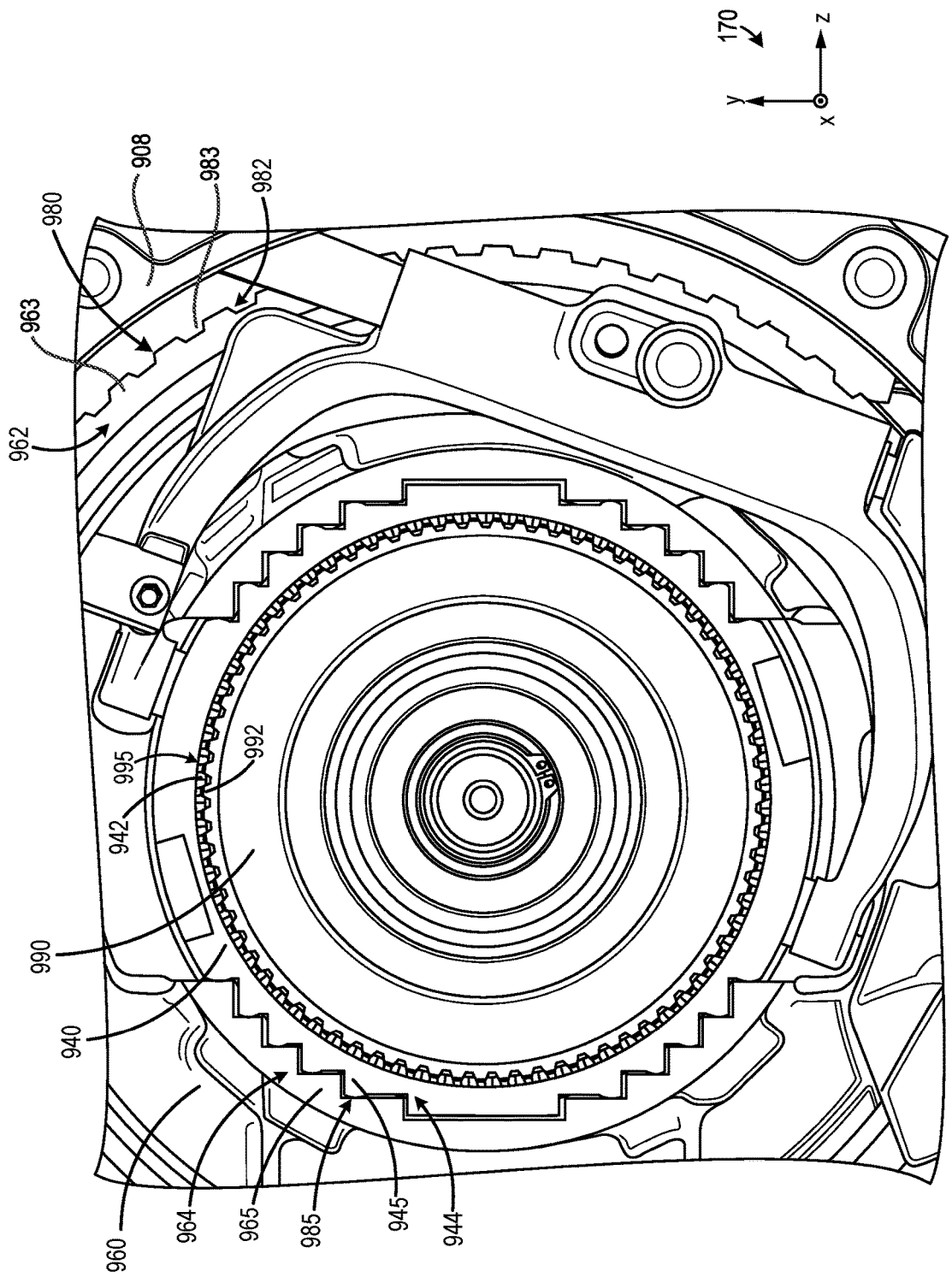
FIG. 9 shows a second example of a housing, grounding plate, and clutch sleeve.
Figure 10:
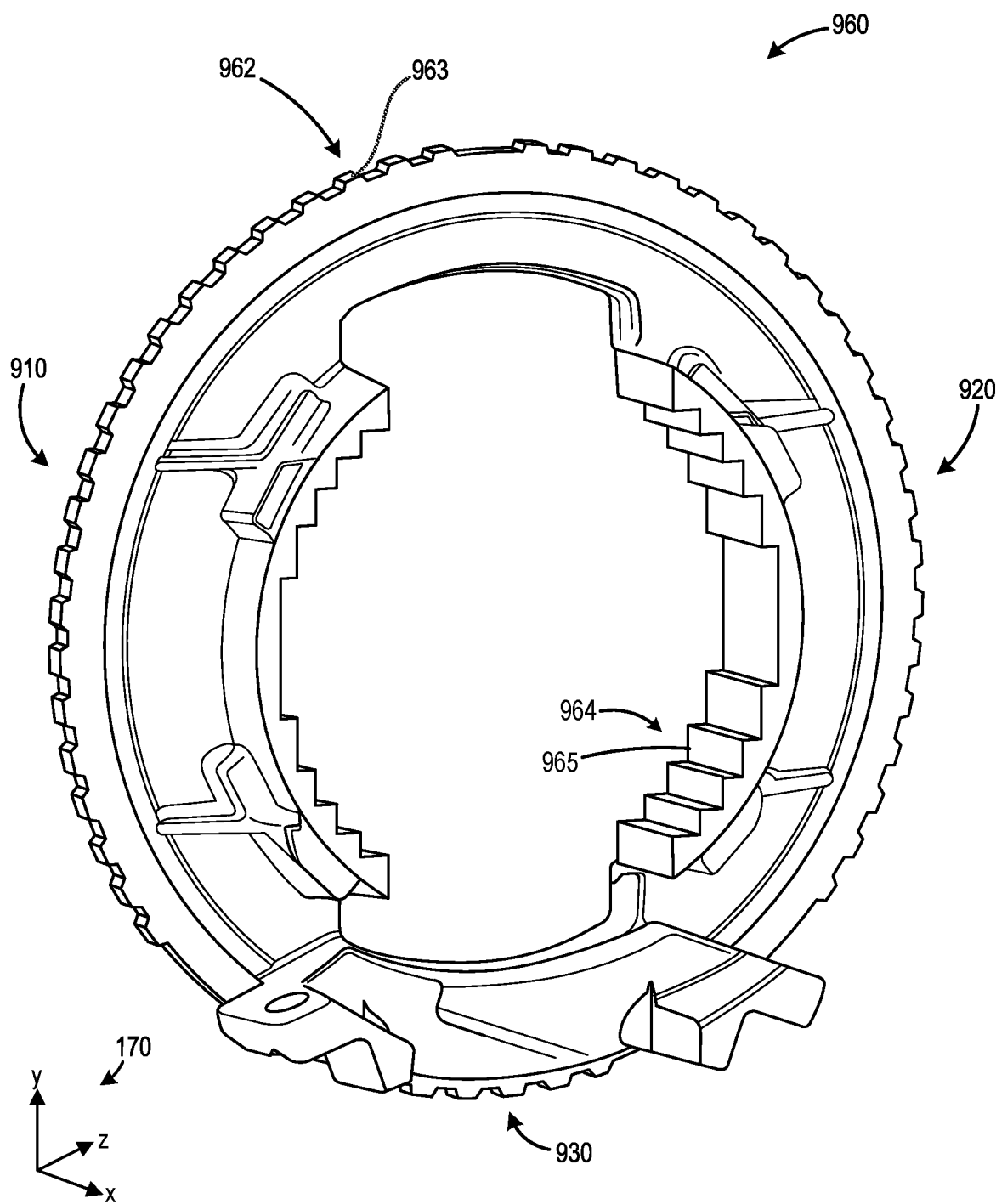
FIG. 10 shows a detailed view of the grounding plate, depicted in FIG. 9.
Figure 11:
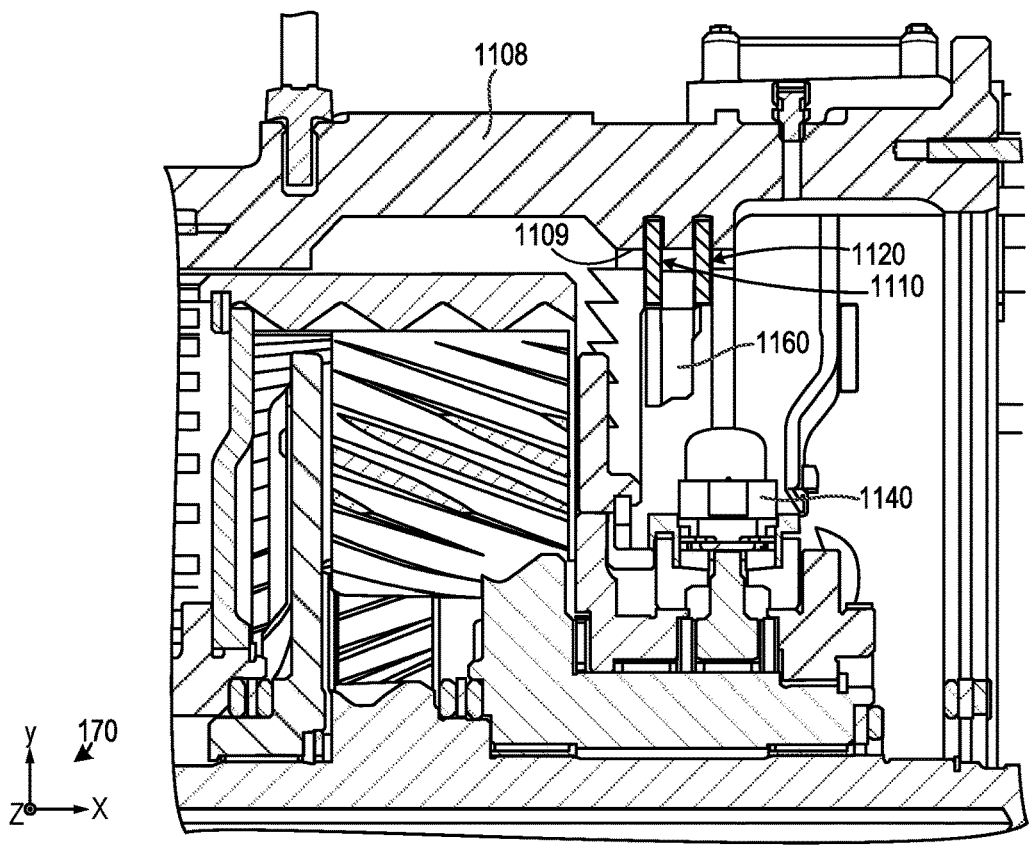
FIGS. 11 and 12 show another example of a transmission with a grounding plate that is axially delimited by retaining rings.
Figure 12:
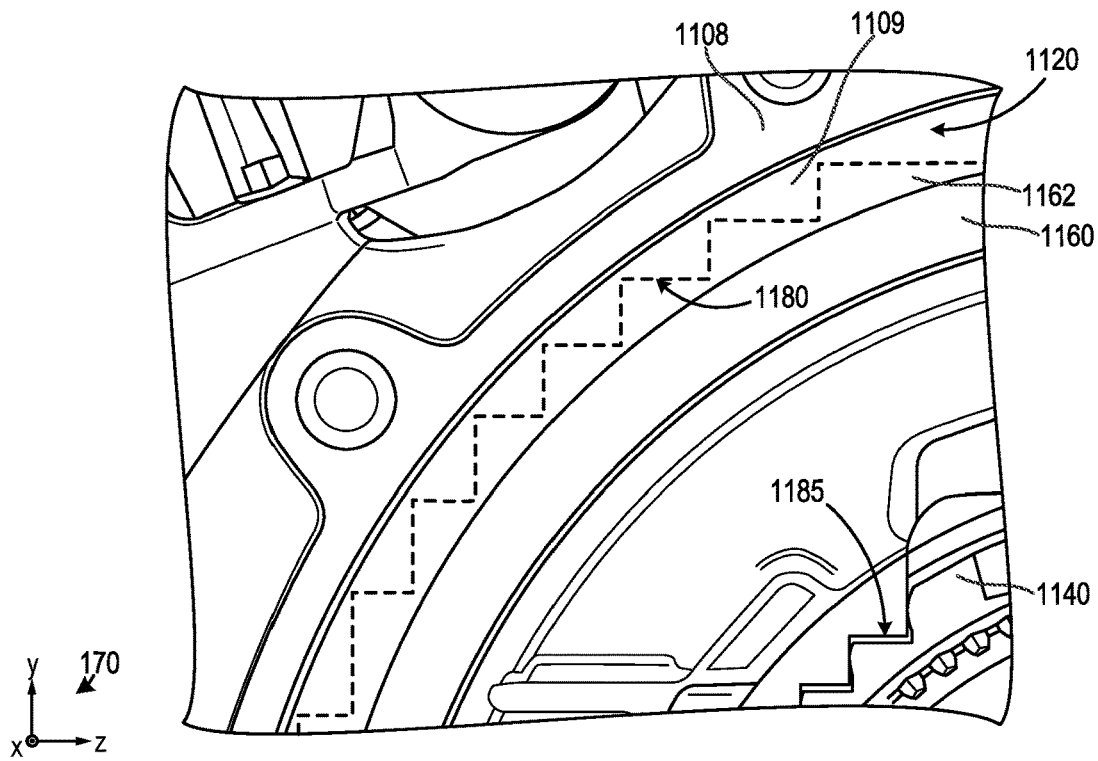

FIG. 1 depicts a vehicle with a powertrain including a grounding assembly having a clutch sleeve and grounding plate assembly for shifting operation in a transmission. FIGS. 2-4 depict a transmission of a powertrain including a grounding plate and clutch sleeve according to a first example. FIGS. 5A-5C illustrate a housing, grounding plate, and clutch sleeve, respectively, and FIGS. 6-7B illustrate interfaces between the housing, grounding plate, and clutch sleeve, in the first example. FIGS. 8A-8I depict various alternative configurations of the interfaces shown in FIGS. 6-7B. FIGS. 9-10 illustrate a second example of a grounding assembly having a grounding plate and a clutch sleeve. FIGS. 11-12 depict an example configuration for retaining a grounding plate within a housing, in one example. FIG. 13 depicts a table representing restricted and over-constrained degrees of freedom which may be present in various use-case examples of a grounding plate and a clutch sleeve.

FIG. 1 schematically illustrates a multi-speed electric powertrain 100 with a transmission 111 for providing power to an axle assembly 106 in a vehicle 101. The vehicle may take a variety of forms in different examples, such as a light, medium, or heavy duty vehicle. Additionally, the powertrain 100 may be adapted for use in front and/or rear axles, as well as steerable and non-steerable axles. To generate power, the powertrain 100 may include an electric motor-generator 102. The electric motor-generator 102 may include conventional components such as a rotor, a stator, a housing, and the like for generating mechanical power as well as electrical power during a regenerative mode, in some cases. In some examples, the powertrain 100 may include a second electric motor-generator, such that each of the first and second electric motor-generators may provide power which can drive the axle assembly 106. In other examples, the vehicle 101 may further include an internal combustion engine for providing mechanical power to another axle. As such, the powertrain 100 may be utilized in a hybrid or electric vehicle (EV) (e.g., battery electric vehicle (BEV)).

In the illustrated example, a first shaft 104 is operably coupled to the electric motor-generator 102 for rotation. The first shaft 104 may extend from the electric motor-generator 102 into a first gear assembly 110 of the transmission 111. Power transferred to the first gear assembly 110 from the electric motor-generator 102 may be transmitted by the first shaft 104 into one side 109 of the first gear assembly 110. The first gear assembly 110 and the electric motor-generator 102 may be situated in a housing 108 with first shaft 104 extending axially within the housing from the electric motor-generator to the first gear assembly 110.

In some examples, the first gear assembly 110 may be a planetary gearset such as a Ravigneaux gearset. In this way, the compactness of the system may be increased when compared to non-planetary gear reductions. In the Ravigneaux example, the first gear assembly 110 may include a first sun gear 112 operably coupled to the first shaft 104 for rotation therewith. Further, the first sun gear 112 may be in meshing engagement with a first set of planet gears 114. Even further, the first set of planet gears 114 may be in meshing engagement with a second set of planet gears 116. In addition to meshing engagement with the first set of planet gears 114, the second set of planet gears 116 may be in meshing engagement with a second sun gear 118 and a ring gear 122. In one example, the first sun gear 112 may have an outermost diameter that is smaller than an outermost diameter of the second sun gear 118. Both of the first and second sets of planet gears 114, 116 may be coupled to a common planet carrier 120 and may rotate independently of the planet carrier. The first set of planet gears 114 and the second set of planet gears 116 may co-rotate with a fixed gear ratio with respect to each other and may each include multiple planet gears.

The first gear assembly 110 may include clutches that are selectively engageable with different portions of the first gear assembly 110, thereby permitting the vehicle 101 to operate at multiple discrete gear ratios. Specifically, in one example, the powertrain may be a three speed powertrain. However, two speed powertrains or powertrains with greater than three ratios have been contemplated. Clutches in the powertrain may not include synchronizer rings, in some examples. Specifically, in one example, the clutches may be sleeved dog clutches with synchronizer rings, omitted. In the illustrated example, a clutch assembly 142 may be selectively engageable with at least a portion of the planet carrier 120. However, the clutch assembly 142 may ground other suitable gears or be omitted from the transmission 111, in other examples. When the clutch assembly 142 is engaged with the planet carrier 120, the planet carrier is mechanically grounded and does not rotate. As described herein, mechanical grounding a component infers that the component is held substantially stationary.

Another clutch assembly 143 may be selectively engageable with at least a portion of the first sun gear 112 and the second sun gear 118. When the clutch assembly 143 is engaged with the first sun gear 112 and the second sun gear 118, the first sun gear and the second sun gear are held and rotate together. A clutch assembly 160, which may include a grounding assembly, may be selectively engageable with at least a portion of the second sun gear 118. When the clutch assembly 160 is engaged with the second sun gear 118, the second sun gear is mechanically grounded and does not rotate. Further, the clutch assemblies 142, 143 and 160 may be shifted between their respective positions of engagement and, a neutral position. In this way, different planetary components in the geartrain may be engaged to achieve different gear ratios (e.g., a first, second or third gear ratio). Other clutch arrangements in the transmission have been envisioned.

The mechanical grounding described above may be accomplished via a grounding plate 162 that is schematically depicted in FIG. 1. However, the grounding plate has greater structural complexity that is elaborated upon herein. The grounding plate 162 may be coupled to the housing 108 at an outer interface of the grounding plate. Further, the grounding plate 162 may include an inner interface designed to selectively mate with a clutch shift sleeve 161 of the clutch assembly 160, so that the clutch shift sleeve is axially movable within the grounding plate. Further, the clutch shift sleeve 161 may be splined to an inner hub for selectively achieving the aforementioned grounding configurations within first gear assembly 110 to operate the transmission 111 in one of the different gear ratios. Specifically, the clutch shift sleeve 161 may be engaged with the planet carrier 120 or the second sun gear 118 and grounded via the grounding plate 162 while the transmission operates in a first or second gear, for example. As such, the planet carrier and second sun gears may be selectively grounded to operate the transmission in a desired operating mode.

Exemplary structures and details of the interfaces of the grounding plate and clutch shift sleeve are elaborated on herein with reference to various examples depicted in FIGS. 2-13. In each example, the grounding assembly may be designed to avoid binding issues and prevent over-constraint of the clutch shift sleeve during operation (e.g., under torque loading). More particularly, the grounding plate 162 may allow for some vertical movement of the clutch sleeve with respect to the grounding plate, where clearances at the interface of the clutch sleeve and grounding plate may be large enough to accommodate a vertical component of a tolerance stack (e.g., radial positional tolerance stack).

The ring gear 122 may serve as the output of the first gear assembly 110 and may be fixedly coupled to a second gear assembly 130. The second gear assembly 130 may include a first gear 132 in meshing engagement with a second gear 134, which may be operably coupled with a second shaft 136. The second shaft 136 may be supported for rotation with one or more bearings. In some examples, the second shaft 136 may be provided in a parallel relationship, or, in some instances, the second shaft may be provided in a concentric relationship with the first shaft 104. A third gear 138 may be disposed at an end of the second shaft 136. Further, the third gear 138 may be of in meshing engagement with the fourth gear 149 disposed on a differential 140. Specifically, the third and fourth gears may form a bevel or hypoid gearset. The differential 140 may be operatively attached to an axle assembly 106. The axle assembly 106 may include a first and second axle shafts 144, 146, for providing rotational power to a first drive wheel 145 and a second drive wheel 147 via a first axle shaft 144 and a second axle shaft 146, respectively. As such, the differential 140 may distribute rotational driving force received, from the first and second gear assemblies 110, 130 of the powertrain 100, to the drive wheels 145, 147, during certain operating conditions.

In some examples, the first shaft 104 may be supported at both ends for rotation by one or more bearings 105 (e.g., ball bearings, needle roller bearings, etc.). The bearings 105 may support and locate the first shaft 104, while also reducing friction to allow for smoother rotation thereof. Further, the bearings 105 which may contribute to positioning of downstream components in the transmission 111, particularly the hub, which is radially positioned to shaft 104 through the second sun gear 118 shaft. The bearings may also constrain downward movement of the inner hub which may reduce the likelihood of the shift sleeve being pushed to the bottom of the grounding plate.

The transmission 111 may operate in at least a first gear ratio, a second gear ratio, and a third gear ratio. The first gear ratio may be higher than the second gear ratio, which may be higher than the third gear ratio. In the first gear ratio, the planet carrier 120 may be held stationary (e.g., grounded) and does not rotate. In the second gear ratio, the second sun gear 118 may be held stationary and does not rotate. In the third gear ratio, the first sun gear 112 and the second sun gear 118 may rotate together. However, the gear ratios may be derived using other gear configurations which may be selected based on the end-use gear reduction objectives.

As illustrated in FIG. 1, the powertrain 100 and axle assembly 106 may be in a perpendicular configuration. As used herein, the phrase "perpendicular configuration" refers to the electric motor-generator providing power that is transmitted perpendicular to the orientation of the axle driving wheel rotation. However, in other examples, the powertrain and axle may be in a parallel configuration, wherein the electric motor-generator provides power that is transmitted parallel to the orientation of the axle driving wheel rotation.

The vehicle 101 may also include a control system 150 with a controller 152. The controller 152 may include a processor 153 and a memory 154. The memory may hold instructions stored therein that when executed by the processor cause the controller 152 to perform various methods, control techniques, etc. described herein. The processor 153 may include a microprocessor unit and/or other types of circuits. The memory 154 may include known data storage mediums such as random access memory, read only memory, keep alive memory, combinations thereof, etc. The controller 152 may receive various signals from sensors 156 positioned in different locations in the vehicle 101 and powertrain 100. The controller 152 may also send control signals to various actuators 158 coupled at different locations in the vehicle 101 and powertrain 100.

An input device 159 may be in communication with the controller 152. For instance, the input device 159 may be a gear selector or drive mode selector. In some examples, the clutches configured as rotation locking assemblies in first gear assembly 110 may be operated by one or more actuators of the actuators 158 coupled to controller 152. In response to a user input via input device 159 and/or based on automatic shift control strategies stored in memory 154, the controller 152 may send a signal causing one or more of the clutches to selectively engage a portion of the first gear assembly 110. To elaborate, in one use-case scenario to shift from neutral to a first gear, the clutch assembly 142 may receive a first gear shift command and in response, move the clutch sleeve 161 to ground the planet carrier 120. Further, to shift from the first gear to a second gear, the clutch assembly 160 may receive a second shift command and in response move the clutch sleeve 161 past the neutral position and into a position that grounds the second sun gear 118. The controller may transition the transmission between discrete gear ratios based on operating conditions such as vehicle speed, vehicle load, battery state of charge (SOC), etc.

An axis system 170 is provided in FIG. 1, as well as FIGS. 2-12 where relevant, for reference. The y-axis may be a vertical axis (e.g., parallel to a gravitational axis), the z-axis may be a lateral axis (e.g., a horizontal axis), and/or the x-axis may be a longitudinal axis, in one example. However, the axes may have other orientations, in other examples. Further, a first rotational axis 175 is illustrated extending through the first gear assembly 110, first shaft 104, electric motor-generator 102 and the clutch assembly 160. A second rotational axis 180 is also illustrated extending through the differential 140, the axle shafts 144, 146 of axle assembly 106, and the driving wheels 145, 147. In one example, where the powertrain and axle are in the perpendicular configuration described above, the first rotational axis 175 and the second (e.g., driving) rotational axis 180 may be oriented perpendicularly to one another in the x-y plane, as shown in FIG. 1.

Figure 3A:
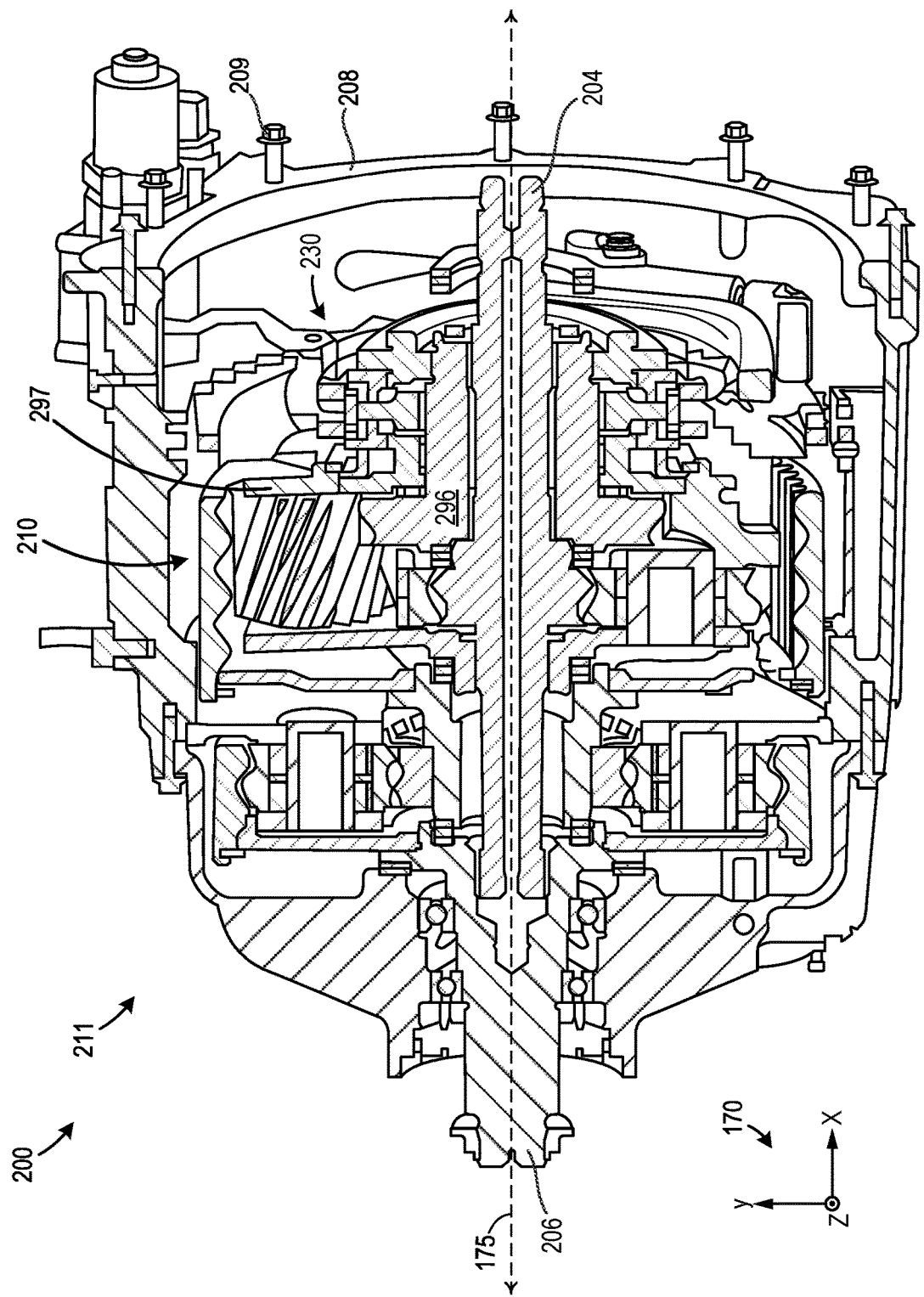
FIG. 3A is a cross-sectional view of the transmission, depicted in FIG. 2.
Figure 3B:
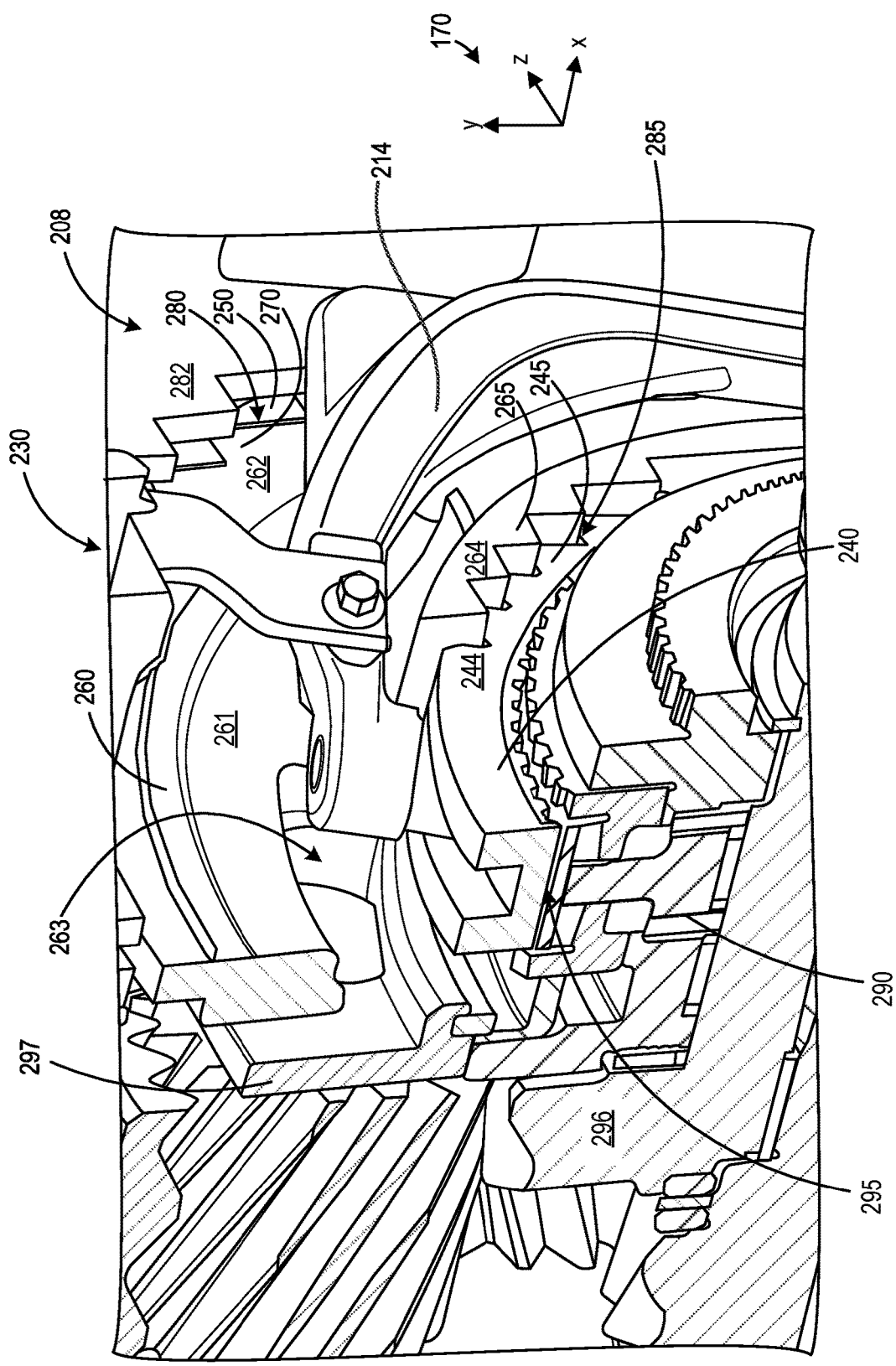
FIG. 3B is a perspective view of a portion of the transmission, particularly illustrating the grounding plate, the clutch sleeve, and an inner hub.
Figure 4:
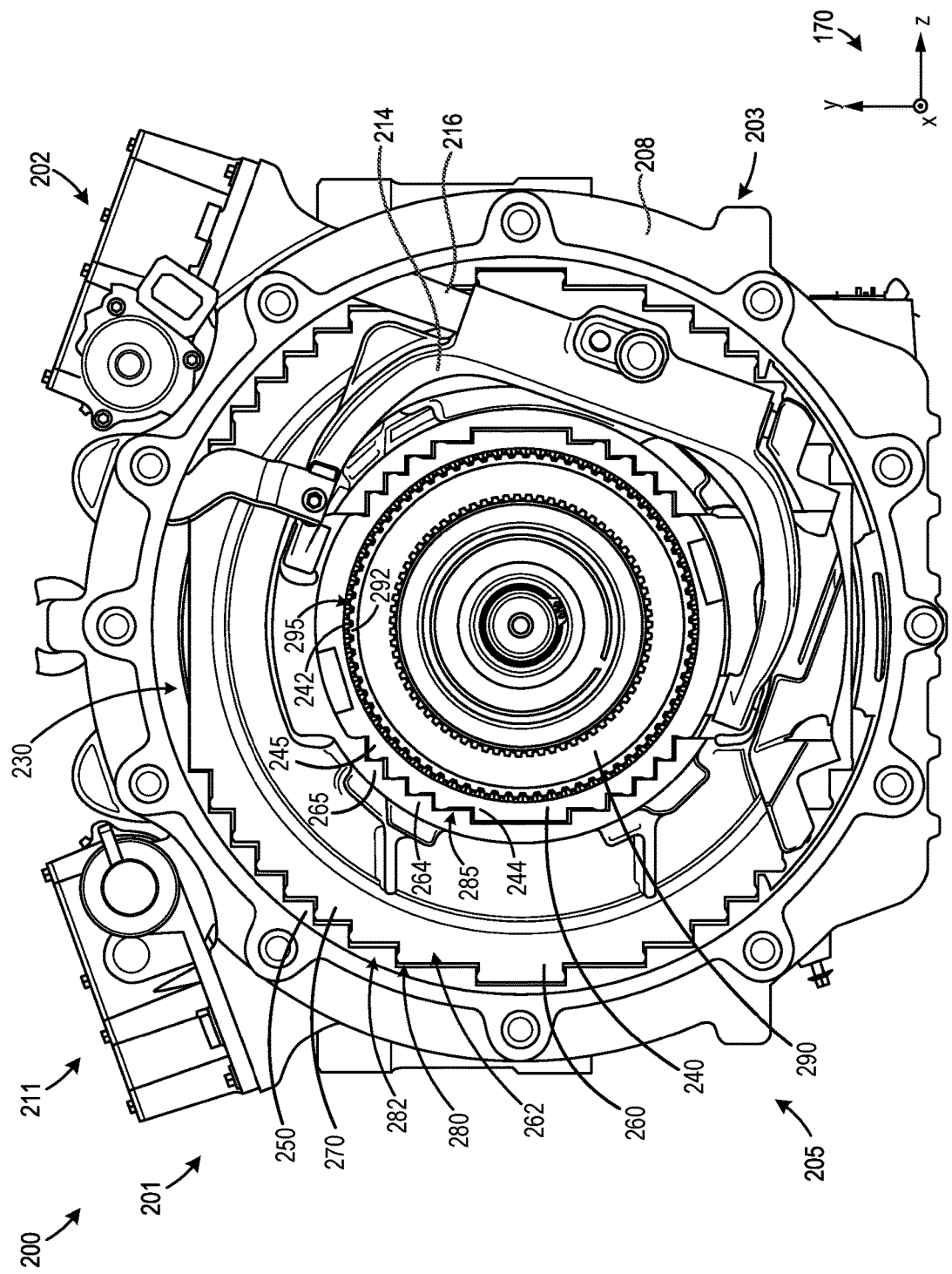
FIG. 4 is another cross-sectional view of the transmission, depicted in FIG. 2.

FIGS. 2-4 show an example of an electric powertrain 200 with a transmission 211. The transmission includes a planetary geartrain 210 with a grounding assembly 230 enclosed within a housing 208. FIGS. 3 and 4 provide cross-sectional views of the transmission housing 208 of FIG. 2. The cross-sectional views, as shown in FIGS. 3A and 3B, are defined by a lateral cut plane taken along a dashed line 3-3, respectively, as indicated in FIG. 2. The powertrain 200 may share common structural and functional features with the powertrain 100, shown in FIG. 1 and vice-versa. For instance, the planetary geartrain 210, as shown in FIG. 3A, which may be similar to the first gear assembly 110 depicted in FIG. 1. As such, the geartrain 210 may be a Ravigneaux gearset. In other examples, the geartrain 210 may have different arrangements, such as, a compound type planetary gearset (e.g., multi-stage planetary (e.g., a two-stage or three-stage planetary system)), a simple planetary, and the like. However, it will be understood that the use of a multi-stage planetary system may increase complexity and costs associated with assembly, as well as the size of the geartrain and housing. In other examples, non-planetary arrangements for the geartrain have been contemplated.

Turning specifically to FIGS. 2 and 3A, the housing 208 may be a multi-section housing with sections that removably attached to one another to enclose an electric motor coupled to the geartrain 210. The sections of the housing may be coupled via bolts 209 and/or other suitable fasteners.

Referring to FIG. 3A, the geartrain 210 may receive rotational power via input shaft 204 and transfer the power via an output shaft 206. The input shaft 204 may be designed to receive power from an electric motor, such as the electric motor-generator 102 in the powertrain 100 of FIG. 1. Further, the output shaft 206 may provide power to final drive components downstream of the geartrain 210, such as a differential. The input and output shafts 204, 206 as well as various gear components within the geartrain 210 may be supported by bearings, such as needle roller bearings.

Also shown in FIGS. 2-4 is a shift fork assembly 212 coupled to the housing 208. The shift fork assembly 212 may include a pronged shift fork 214 mounted to a shaft 216. The shift fork 214 may be engaged with the clutch sleeve 240 and displaced by an actuator via the shaft 216, whereby displacement of the shift fork 214 is translated into axial translation of the clutch sleeve 240 for shifting the powertrain into different gear ratios. Specifically, the clutch sleeve may be adjusted by the shift fork to place the transmission in a first gear, a neutral state, and a second gear.

The grounding assembly 230 of the powertrain 200 may further include a clutch sleeve 240 and a grounding plate 260. In some examples, the clutch sleeve and grounding plate may cooperate to receive torque transmitted in a plane perpendicular to a rotational axis 175 from one or both of a planet carrier 297 and a second sun gear 296 of the geartrain 210, and hold these components stationary while the transmission operates in different gears.

Turning briefly to FIG. 4, the grounding assembly 230 is again illustrated with the grounding plate 260, clutch sleeve 240, and hub 290 positioned within the housing 208. More particularly, FIG. 4 illustrates the interface 285 between the clutch sleeve 240 and the grounding plate 260, as well as the interface 280 between the grounding plate 260 and the housing 208. The housing 208, grounding plate 260, and clutch sleeve 240 are depicted separately in FIGS. 5A-5C, respectively. A more detailed view of the interfaces is illustrated in FIG. 6. Further, the interfaces 285 and 280 are separately illustrated in FIGS. 7A and 7B, respectively. As such, the first example of the interfaces and grounding assembly components may be described with reference to any of FIGS. 4-7B, and common numbering of components may be used accordingly.

FIGS. 3B and 4 show views of an example of the grounding plate 260 having an outer stepped splined surface 262, mating with an inner stepped splined surface 282 of the housing 208 at the interface 280, and an inner stepped splined surface 264, mating with an outer stepped splined surface 244 of the clutch sleeve 240 at an interface 285. The interface 280 may include a plurality of horizontal steps on each of the outer stepped splined surface 262 of the grounding plate 260 and the inner stepped splined surface 282 of the housing 208. Additionally, the interface 285 includes a plurality of vertical steps on each of the outer stepped splined surface 244 of the clutch sleeve 240 and the inner stepped splined surface 264 of the grounding plate 260. Particularly illustrated in FIGS. 3B and 4 is a relative positioning of the grounding plate 260, clutch sleeve 240, and hub 290 and the respective steps or splines provided thereon. For instance, the grounding plate 260, clutch sleeve 240, and hub 290 may be generally coaxially arranged, due to the splined engagement between the components.

In some examples, the outer splined surface 262 on the grounding plate may extend radially outward from a main body 261 of the grounding plate 260 and be positioned at an axial middle portion of the main body 261. Further, the main body 261 of the grounding plate 260 may include one or more openings 263 for allowing movement of a shift fork 214 therethrough as the shift fork moves (e.g., axially translates) the clutch sleeve 240 to shift between various grounding configurations (e.g., to achieve different gear ratios). Accordingly, the clutch sleeve 240 may be designed to be axially translated due to movement of the shift fork 214.

The clutch sleeve 240 may further include an inner splined surface 242 mating with an outer splined surface 292 of the inner hub 290 at an interface 295, as indicated in FIGS. 3B and 4. In some cases, the interface 295 may include a tapered splined connection, such that the inner splined surface 242 of the clutch sleeve 240 and an outer splined surface 292 of the inner hub 290 each include axially extending teeth tapered at their axial ends and designed to mate with one another, or may each include involute splines. In this way, the weight of the clutch sleeve 240 may be supported by the inner hub 290. Further, the inner hub 290 may be positioned coaxially within the clutch sleeve 240, so that inner hub 290 may radially position the clutch sleeve 240 with respect to the input shaft 204 and/or second sun gear 296 shaft.

The clutch sleeve 240 and inner hub 290 may be designed to selectively ground the planet carrier, or a gear via the grounding plate to operate the vehicle in a desired gear ratio, as previously indicated. During a shifting transient, the clutch sleeve may move into the engaged position, the clutch sleeve, gear, and inner hub are locked together, grounding the engaged gear to the housing via the grounding plate. In this way, the clutch sleeve may smoothly engage a gear during a shifting event, thereby reducing noise, vibration, and harshness (NVH). In the illustrated embodiment, the transmission does not include synchronizer rings. However, in other embodiments, the transmission may utilize synchronizer rings.

In one example, interface 285 between the grounding plate 260 and the clutch sleeve 240 may be defined by an inner stepped splined surface 264 that includes vertical steps 265 at an inner periphery of the grounding plate 260. The inner stepped splined surface 264 mates with an outer stepped splined surface 244 of the clutch sleeve 240. As such, the outer stepped splined surface 244 of the clutch sleeve 240 may include vertical steps 245 at an outer periphery of the clutch sleeve.

Figure 7A:
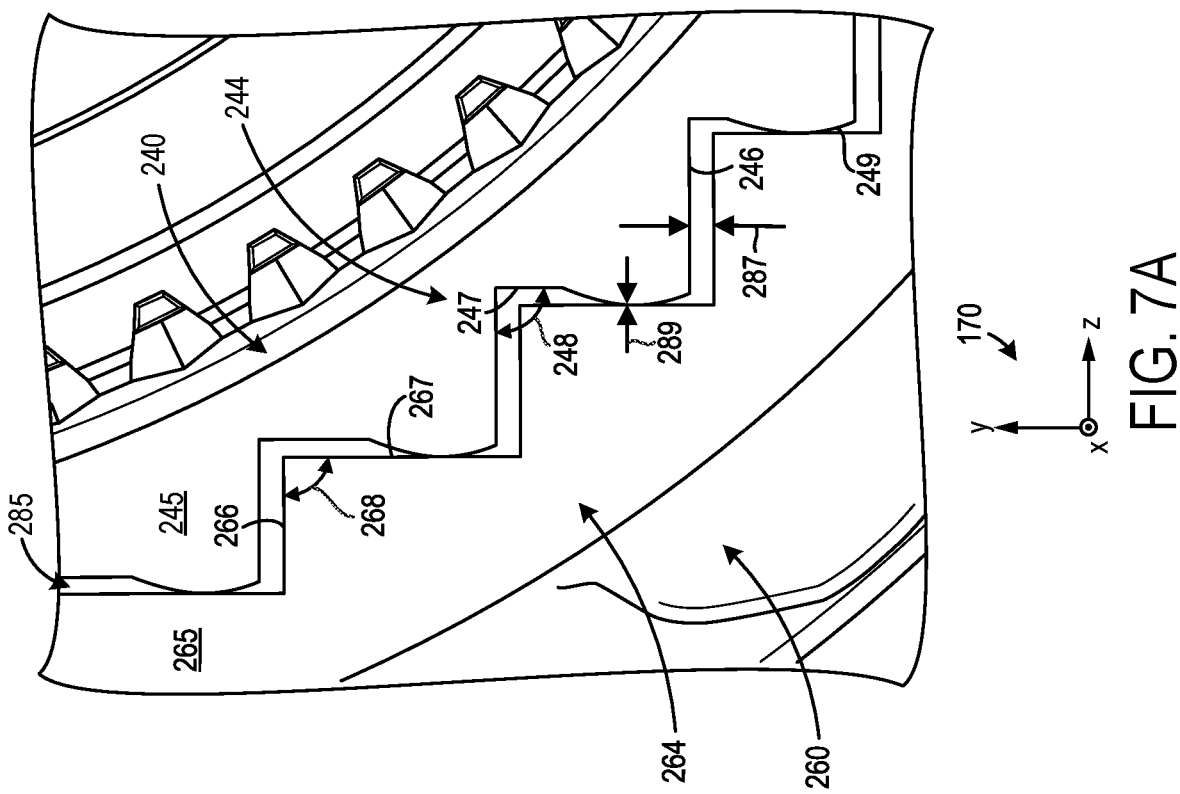

Each of the vertical steps 265 of the inner stepped splined surface 264 of the grounding plate 260 may include a first side 266 that intersects a second side 267 at an angle 268, as particularly illustrated in FIGS. 6 and 7A. In some examples, the angle 268 may be 90 degrees. For instance, the first and second sides 266, 267 may be perpendicularly intersecting horizontal and vertical sides, respectively. However, other substantially perpendicular orientations have been contemplated, in other examples, wherein the angle 268 is near 90 degrees, though such orientations may lead to undesirable loading at the interface 285 and may consequently hinder the ability of the clutch sleeve 240 to axially translate. Similarly, each of the vertical steps 245 of the outer stepped splined surface 244 of the clutch sleeve 240 may have a first side 246 intersecting a second side 247 at an angle 248. Again, the first and second sides 246, 247 may be horizontal and vertical sides, respectively, perpendicularly intersecting such that the angle 248 is 90 degrees or approximately 90 degrees.

When the clutch sleeve 240 is positioned within the grounding plate 260, as shown in FIG. 4, the outer stepped splined surface 244 of the clutch sleeve may mate with the inner stepped splined surface 264 of the grounding plate. As such, the first and second sides 266, 267 of the grounding plate may be positioned adjacent to the first and second sides 246, 247, respectively, of the clutch sleeve. Further, the inner hub 290 may be coaxially positioned within the clutch sleeve 240, where the outer splined surface 292 of the inner hub meshes with the inner splined surface 242 of the clutch sleeve. In this way, torque from the planetary geartrain (e.g., the planet carrier or second sun gear) may be received at the inner hub and transmitted through the splines of the inner hub outer splined surface 292 and clutch sleeve inner splined surface 242, and then transmitted through the clutch sleeve to the grounding plate 260 via the vertical steps 245 of the clutch sleeve outer splined surface 244 and the vertical steps 265 of the grounding plate inner splined surface 264. Further, the mating engagement between the inner splined surface 264 of the grounding plate 260 and the outer splined surface 244 of the clutch sleeve 240 may permit axial translation of the clutch sleeve 240 with respect to the grounding assembly.

Referring to FIGS. 5B and 5C, the vertical steps 265 and 245 of the grounding plate 260 and the clutch sleeve 240, respectively, may be partitioned into four quadrants along the inner stepped splined surface 264 (e.g., quadrants 510, 512, 514, 516) and outer stepped splined surface 244 (e.g., quadrants 520, 522, 524, 526), respectively, in one example.

Referring to FIGS. 4 and 5B-5C, the grounding plate 260 is shown having a number of vertical steps 265 provided in each of the quadrants, shown in FIG. 4 as quadrants 201, 202, 203, and 205 (i.e., corresponding to quadrants 510-516 and 520-526 in FIGS. 5A and 5B, respectively), the clutch sleeve 240 also having a number of vertical steps 245 provided in each of the four quadrants and designed to mate with the interface defined by the vertical steps of the grounding plate. However, in other examples, other numbers of vertical steps may be provided on each of the grounding plate and the clutch sleeve, and/or different numbers of vertical steps may be provided in different quadrants, so long as the vertical steps of the stepped splined surfaces 264, 244 of the grounding plate 260 and clutch sleeve 240, respectively, cooperate to form a suitable mating interface 285.

Continuing with FIGS. 4 and 5B-5C, the vertical steps 265, 245 provided in each of the quadrants described above may allow torque reaction loads between the stepped splined surfaces 264, 244 of the grounding plate 260 and the clutch sleeve 240, respectively, to be dispersed over more contact area, thus reducing contact stress at any given point of the contact areas. Further, when vertical steps are provided in each of the four quadrants, opposing quadrants may react torque. For instance, opposing portions of interface 285 in quadrants 202 and 205 (e.g., vertical steps 265 of grounding plate 260 in quadrants 512, 516, shown in FIG. 5B, and vertical steps 245 of clutch sleeve 240 in quadrants 522, 524, shown in FIG. 5C) may react torque having a clockwise direction at the clutch sleeve 240. Further, opposing portions of interface 285 in quadrants 201 and 203 (e.g., vertical steps 265 of grounding plate 260 in quadrants 510, 514, shown in FIG. 5B, and vertical steps 245 of clutch sleeve 240 in quadrants 520, 526, shown in FIG. 5C) may react torque having a counterclockwise (CCW) direction at the clutch sleeve 240. Hence, the transmission may react torque in both clockwise (CW) and CCW rotations. In one specific embodiment, a minimum of one step may be used in each quadrant to react both the CW and CCW torque.

The interface 285 may further include a clearance 287, as illustrated in FIGS. 6 and 7A. The clearance 287 may be a vertical clearance formed between pairs of adjacent vertical steps 265, 245 (i.e., between first (e.g., horizontal) sides 266, 246) of the grounding plate 260 and the clutch sleeve 240, respectively. The clearance 287 may allow for some vertical movement of the clutch sleeve 240 within the grounding plate 260 and a small amount of tilt of the clutch sleeve 240 in the vertical plane (e.g., about the z-axis), which may help to avoid binding issues that would hinder the ability of the clutch sleeve 240 to slide axially with respect to the grounding plate 260. Further, the clearance 287 may allow the clutch sleeve 240 to find its equilibrium with respect to the grounding plate so as to avoid being pinched between an outer diameter of the inner hub and the inner stepped splined surface 264 of the grounding plate 260. Even further, the clearance 287 may be of a dimension sufficient to accommodate a full vertical component of a radial positional tolerance stack, further avoiding (e.g., preventing) binding. In some examples, the dimension may be selected based on various structural considerations. For instance, the clearance may be greater than or equal to a component (e.g., the vertical component) of the radial positional tolerance stack of the grounding plate and clutch sleeve assembly. In one use-case example, the positional tolerance stack value may be 1.362 millimeters (mm) and the clearance may therefore be greater than 1.362 mm.

Further, in some examples, the interface 285 may include a flank gap 289, which may be a horizontal flank gap defined between the second (e.g., vertical) sides 267 of the grounding plate 260 and curved surfaces 249 of the clutch sleeve 240. The flank gap 289 may, in some cases, vary along the interface 285 at each step of the mating vertical steps 265, 245. In one example, the flank gap 289 may incrementally decrease at each step as the steps approach a horizontal plane extending through the center of the clutch sleeve 240 and/or grounding plate 260. In this way, the flank gap 289 may be varied for more balanced loading between each of the steps of the grounding plate and the clutch sleeve as they react torque and the components flex. In one example, the flank gap 289 may be designed differently at each step to further allow for more equal loading of the steps 265, 245 as the clearance 287 is taken up (e.g., decreases) and the components flex. Thus, backlash between the vertical steps 265, 245 may be controlled (e.g., restricted) by varying the flank gap 289. Further, the flank gap 289 may change as the clutch sleeve 240 moves vertically within the grounding plate 260, and a size of the flank gap 289 may be selected accordingly, taking this change into account, so as to maintain some flank gap space to reduce the chance of the components binding or wedging.

The vertical steps 265, 245 of the grounding plate 260 and the clutch sleeve 240 may, in some examples, have varying widths (e.g., as defined along the first sides 266, 246, respectively), which may allow for desired placement of the vertical steps along respective outer and inner peripheries of the grounding plate and the clutch sleeve to more evenly disperse load distribution, thereby increase the assembly's durability. In other embodiments, however, the vertical steps may have the same width. Further, the vertical steps 265, 245 of the grounding plate 260 and the clutch sleeve 240 may, in some examples, have different depths (e.g., as defined along second sides 267, 247, respectively) and, in other examples, may have the same depth. The profile of the steps may be selected based on expected loading of the different components in the assembly, the material construction of the components, ease of placement, manufacturability, etc. Thus, the specific contours of the steps may be chosen to increase grounding plate durability.

In some examples, the vertical steps 265, 245 of the grounding plate 260 and the clutch sleeve 240 may include a first and second side each having a flat (e.g., straight) profile. However, in one example, as particularly illustrated in FIGS. 6 and 7A, the second (e.g., vertical) sides 247 of the vertical steps 245 of the clutch sleeve 240 may include a curved (e.g., elliptical or involute) profile along a portion of their surfaces, as indicated at 249 in FIG. 7A. In other examples, other configurations of vertical steps including one or more curved profiles have been contemplated. For instance, in addition or as an alternative to the curved surface on the second sides 247 of the clutch sleeve's vertical steps 245, the second sides 267 of the vertical steps 265 of the grounding plate 260 may include a curved (e.g., elliptical or involute) surface along a portion of their profile. In still other examples, the first and/or second sides of one or both of the vertical steps 265, 245 of the grounding plate 260 and the clutch sleeve 240, respectively, may include a tapered profile. The inclusion of a curved and/or tapered profile, particularly on the second side of one or both of the different sets of vertical steps may reduce or eliminate edge loading when the clutch sleeve and grounding plate interface is under a torque load during operation, thus reducing a chance of uneven wear and/or component degradation. Various configurations of the vertical step profiles at the interface 285 will be shown and discussed further with reference to FIGS. 8A-8C.

Returning to FIG. 4, the interface 280 between the grounding plate 260 and the housing 208 may be defined by an outer stepped splined surface 262 on grounding plate 260 and an inner stepped splined surface 282 of the housing 208. The grounding plate 260 may further include horizontal steps 270 along outer stepped splined surface 262 designed to mate with the inner stepped splined surface 282 of the housing 208. As such, the inner stepped splined surface 282 of the housing 208 may include horizontal steps 250 at an inner periphery of the housing.

Each of the horizontal steps 270 of the outer stepped splined surface 262 of the grounding plate 260 may include a first side 271 intersecting a second side 272 at an angle 273, as particularly illustrated in FIGS. 6 and 7B. In some examples, the angle 273 may be 90 degrees. For instance, the first and second sides 271, 272 may be perpendicularly intersecting horizontal and vertical sides, respectively. However, other substantially perpendicular orientations have been contemplated, in other examples, wherein the angle 273 is near 90 degrees. Similarly, each of the horizontal steps 250 of the inner stepped splined surface 282 of the housing 208 may include a first side 251 intersecting a second side 252 at an angle 253. Again, the first and second sides 251, 252 may be horizontal and vertical sides, respectively, perpendicularly intersecting such that the angle 253 is 90 degrees.

When the grounding plate 260 is positioned within the housing 208, as shown in FIGS. 4, 6 and 7B, the outer stepped splined surface 262 of the grounding plate may mate with the inner stepped splined surface 282 of the housing. As such, first sides 271 of the grounding plate horizontal steps 270 may be adjacent the first sides 251 of the housing horizontal steps 250, and the second sides 272 of the grounding plate horizontal steps may be adjacent the second sides 252 of the housing horizontal steps. Further, the grounding plate 260 may be supported by the housing 208, such that the weight of the grounding plate 260 may be transferred through the lower horizontal steps 270, 250 of the grounding plate 260 and the housing 208, respectively.

Similar to the partitioning of the vertical steps 245 and 265 described above with respect to the clutch sleeve 240 and grounding plate 260, respectively, the horizontal steps may be partitioned into four quadrants. Referring to FIGS. 5A and 5B, the horizontal steps 270, 250 of the grounding plate 260 and the housing 208, respectively, may be partitioned into four quadrants along the outer stepped splined surface 262 (e.g., quadrants 530, 532, 534, 536) and the inner stepped splined surface 282 (e.g., quadrants 510, 512, 514, 516), respectively.

In the illustrated example, referring to FIG. 4, the grounding plate 260 and the housing 208 are shown having horizontal steps 270, 250, respectively, provided in each of the quadrants 201, 202, 203, and 205. However, in other examples, other numbers of horizontal steps may be provided on each of the grounding plate and the housing, and/or different numbers of horizontal steps may be provided in different quadrants, so long as the horizontal steps of the stepped splined surfaces 262, 282 of the grounding plate 260 and the housing 208, respectively, cooperate to form a suitable mating interface 280.

Referring to FIGS. 4 and 5A-5B, the horizontal steps provided in each of the quadrants may allow torque reaction loads between the stepped splined surfaces 262, 282 of the grounding plate 260 and the housing 208, respectively, to be dispersed over more contact area, thus reducing contact stress at any given point of the contact areas. Further, when horizontal steps are provided in each of the four quadrants, opposing quadrants may react torque. For instance, opposing portions of interface 280 in quadrants 202 and 205 (e.g., horizontal steps 270 of the grounding plate 260 in quadrants 512, 516, as shown in FIG. 5B, and horizontal steps 250 of the housing 208 in quadrants 532, 536, as shown in FIG. 5A) may react torque having a clockwise direction at the grounding plate 260. On the other hand, opposing portions of interface 280 in quadrants 201 and 203 (e.g., horizontal steps 270 of the grounding plate 260 in quadrants 510, 514, as shown in FIG. 5B, and horizontal steps 250 of the housing 208 in quadrants 530, 534, as shown in FIG. 5A) may react torque having a CCW direction at the grounding plate 260. In one specific embodiment, a minimum of one step may be used in each quadrant to react both the CW and CCW torque. Further, the grounding plate 260 may react torque to prevent rotation of the clutch sleeve 240 about the x-axis.

The interface 280 may further include a clearance 255, as illustrated in the detail views of FIGS. 6 and 7B. The clearance 255 may be a horizontal clearance formed between pairs of adjacent horizontal steps 270, 250 (i.e., between vertical sides 272, 252) of the grounding plate 260 and the housing 208, respectively. The clearance 255 may thus provide some horizontal positional tolerance, allowing for some horizontal movement of the grounding plate 260 with respect to the housing 208. Such a configuration may further allow the clutch sleeve 240, slidably held within the grounding plate 260, to find its equilibrium (e.g., desired operating center) so as to avoid being pinched between an outer diameter of the inner hub 290 and the inner stepped splined surface 264 of the grounding plate 260. The inner hub 290, in splined engagement with the clutch sleeve 240, may further contribute to radial positioning (e.g., centering) and guiding the axial translation of the clutch sleeve 240 during a shift event. Additionally, in one example, when the horizontal stepped splined interface 280 is used in conjunction with the vertical stepped splined interface 285, horizontal and vertical displacement over-constraint may be avoided, which may allow the inner hub to find its operating center. Again, the clearance 255 may be selected to accommodate for the horizontal tolerance stack of the assembly, which may help to further prevent binding issues.

The interface 280 may include a flank gap 257, which may be a vertical flank gap defined between the first (e.g., horizontal) sides 271 of the grounding plate 260, and curved surfaces 259 of the housing 208, respectively. Further, the flank gap 257 may vary in size along the interface 280 at each step of the mating horizontal steps 270, 250. In one example, the flank gap 257 may be designed differently at each step to allow a more equal loading of steps 270, 250 as the clearance 255 is taken up (e.g., decreases) under a torque load, such that backlash between the horizontal steps 270, 250 may be controlled (e.g., restricted) by varying the flank gap 257. Further, the flank gap 257 may change as the grounding plate 260 moves horizontally within the housing 208, and the size of the flank gap 257 may be selected accordingly, taking this change into account, to provide sufficient space to reduce the chance of binding of the components.

The horizontal steps 270, 250 of the grounding plate 260 and the housing 208 may, in some examples, have the same widths (e.g., as defined along the first sides 271, 251, respectively). However, in other examples, the horizontal steps may have varying widths, which may allow for a desired placement of the steps along the respective outer and inner peripheries of the grounding plate and the housing. Further, the horizontal steps 270, 250 may, in some examples, have different depths (e.g., as defined along the second sides 272, 252, respectively) and, in other examples, may have the same depth.

In some examples, the horizontal steps 270, 250 of the grounding plate 260 and the housing 208 may include first and second sides each having a flat profile. However, in one example, as particularly illustrated in FIGS. 6 and 7B, the first (e.g., horizontal) sides 271 of the horizontal steps 270 of the grounding plate 260 may include a curved (e.g., elliptical or involute) profile, as indicated at 259 in FIG. 7B. In other examples, other configurations of horizontal steps including one or more curved profiles have been contemplated. For instance, in addition or as an alternative to the curved profile on the first sides 271 of the grounding plate's horizontal steps 270, the first sides 251 of the horizontal steps 250 of the housing may include a curved (e.g., elliptical or involute) profile. In still other examples, the first and/or second sides of one or both of the horizontal steps 270, 250 of the grounding plate 260 and the housing 208, respectively, may include a tapered profile. The inclusion of a curved and/or tapered profile, particularly on the first sides of one or both of the sets of horizontal steps, may reduce or eliminate edge loading that may result when the outer stepped splined surface 262 of the grounding plate 260 is under a torque load, thus reducing a chance of uneven wear and/or component degradation. Various configurations of the horizontal step profiles at the interface will be shown and discussed further with reference to FIGS. 8D-8I.

The combined effect of the vertical stepped splined surfaces, at the interface 285 of the grounding plate 260 and the clutch sleeve 240, and the horizontal stepped splined surfaces, at the interface 280 of the grounding plate 260 and the housing 208, provides for vertical positional tolerance of the clutch sleeve 240 with respect to the grounding plate 260 and horizontal positional tolerance of the clutch sleeve 240 with respect to the housing 208 through the horizontal positional tolerance of the grounding plate 260 with respect to the housing 208. In other words, the clutch sleeve 240 and the grounding plate 260 may be allowed some vertical and horizontal movement, respectively. The vertical steps 245, 265 of the clutch sleeve 240 and the grounding plate 260, respectively, may further allow for some tilting of the clutch sleeve 240 in a vertical plane (e.g., some rotation about the z-axis in the x-y plane). The horizontal steps 270, 250 of the grounding plate 260 and the housing 208, respectively, may further allow for some tilting of the clutch sleeve 240 in a horizontal plane (e.g., some rotation about the y-axis in the x-z plane). In this way, the clutch sleeve 240, with the inner hub 290 splined to the interior surface thereof, may be better able to find its equilibrium. In this way, the clutch sleeve 240, with the inner hub 290 splined to the interior surface thereof, may be better able to find its equilibrium. Further, by allowing for smoother axial translation of the clutch sleeve 240 and inner hub 290, the chance of binding within the assembly may be reduced.

Figure 8C:
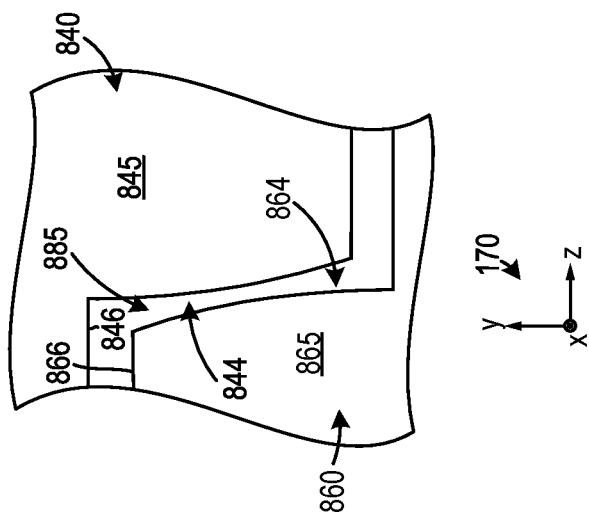
FIGS. 8A-8I show different examples of stepped interfaces with a curved profile.
Figure 8B:
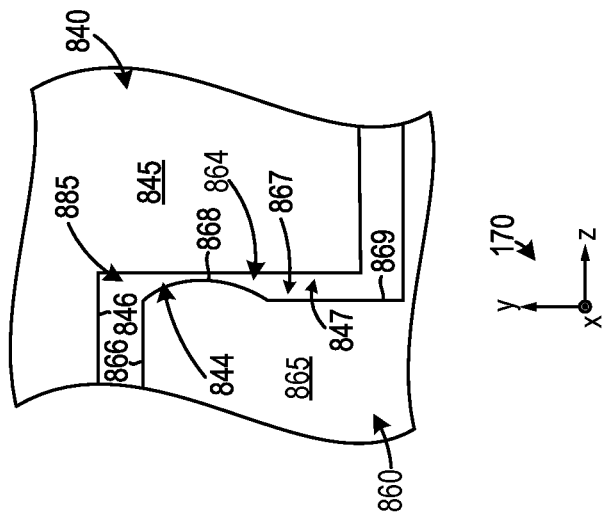
Figure 8A:
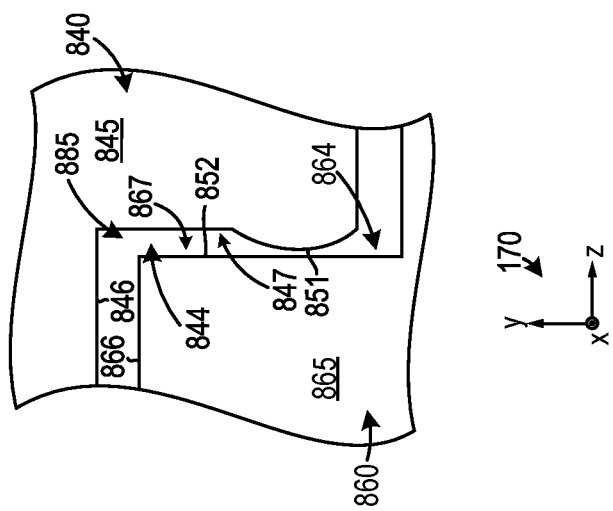

Turning to FIGS. 8A-8C and 8H, examples of an interface between mating vertical steps of a grounding plate 860 and a clutch sleeve 840 are depicted. It will be understood that, in some examples, the vertical spline steps of the grounding plate 860 and the clutch sleeve 840, designed to mate at an interface 885 as shown in FIGS. 8A-8C and 8H, may be included in the clutch sleeve 240 shown in FIGS. 2-7A, representing a lower left quadrant section of the interface 285 shown in FIG. 4. As such, a vertical step 845 on an inner stepped splined surface 864 of the grounding plate 860 may include a first (e.g., horizontal) side 866. Further, the vertical step 865 of the outer stepped splined surface 844 of the clutch sleeve 840 may include a first side 846. Further, as shown in FIGS. 8A and 8B the vertical step 845 include a second (e.g., vertical side) 867 and the vertical step 865 include a second (e.g., vertical) side 847. In other examples, the splined surface profiles described in FIGS. 8A-8C and 8H may be implemented in the different interfaces described herein.

As depicted in FIG. 8A, the second side 847 of the clutch sleeve vertical step 845 may include a curved section 851 and a flat section 852, while the second side 867 of the grounding plate vertical step 865 may include a continuous flat section. FIG. 8B depicts the second side 847 of the clutch sleeve vertical step 845 may include a continuous flat section, and the second side 867 of the grounding plate vertical step 865 may include a curved section 868 and a flat section 869. FIG. 8C depicts a third example, where both of the second sides 867, 847 of the grounding plate and clutch sleeve vertical steps 865, 845 include the curved sections 868, 851, respectively. In any of the examples of FIGS. 8A-8C, curved sections 868 and/or 851 may each include a curved profile, such as an elliptical or involute profile. Further, the curved sections 868 and/or 851 may be positive (e.g., convex) curved sections extending from the second side 867 or 847, respectively, and therefore have a radius of curvature. However, in different examples, the use of other curved profiles has been contemplated.

In some examples, the curved section 851 on a vertical step 845 of the clutch sleeve 840 may be provided at an outer end portion of the second side 847 with respect to a central horizontal plane extending through the clutch sleeve. As such, the flat section 852 may be provided at an inner end portion of the second side 847, adjacent to the curved section 851.

Further, the curved section 868 on a vertical step 865 of the grounding plate 860 may be provided at an inner end portion of the second side 867 with respect to a central horizontal plane extending through the grounding plate, and the flat section 869 may be provided at an outer end portion of the second side 867, adjacent to the curved section 868. For instance, for mating vertical steps 845, 865 in a lower quadrant, as illustrated in FIGS. 8A-8C, a curved section 851 on the second side 847 of the clutch sleeve 840 may be positioned below the flat section 852 (i.e., at an outer portion of the second side 847), and a curved section 868 on the second side 867 of the grounding plate 860 may be positioned above the flat section 869 (at an inner portion of the second side 867). Conversely, for mating vertical steps 845, 865 in an upper quadrant, a curved section 851 on the second side 847 of the clutch sleeve 840 may be positioned above the flat section 852 (i.e., at an outer portion of the second side 847), and a curved section 868 on the second side 867 of the grounding plate 860 may be positioned below the flat section 869 (at an inner portion of the second side 867). However, in other examples, any of the sides having a curved section may not include a flat section, such that the entirety of the second side includes a curved profile.

The inclusion of a curved surface on one or both of inner periphery of the grounding plate or outer diameter of the clutch sleeve, in the examples described herein, may help to reduce edge loading at an interface between the clutch sleeve and the grounding plate, such as interface 285 between clutch sleeve 240 and grounding plate 260 in FIGS. 4, 6, and 7A, when the components are under a torque load. However, to reduce cost and complexity associated with manufacturing of the components, the curved surface may be provided on one of the second side of the inner vertical steps of the grounding plate or the second side of the outer vertical steps of the clutch sleeve, and a substantially flat surface may be provided on the other of the second side of the inner vertical steps of the grounding plate or the first side of the outer vertical steps of the clutch sleeve, such as, for instance, in the manner depicted via FIG. 8A. Further, FIG. 8H shows an embodiment of a stepped interface where the horizontal and vertical sides in the grounding plate 860 and the clutch sleeve 840 have substantially planar profiles.

Figure 8F:
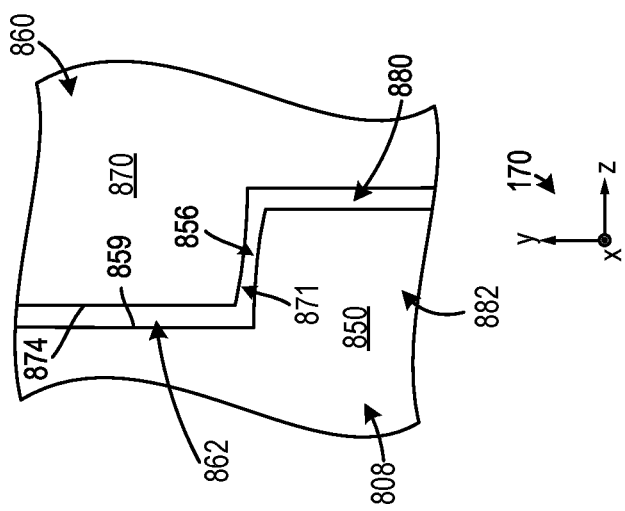
Figure 8E:
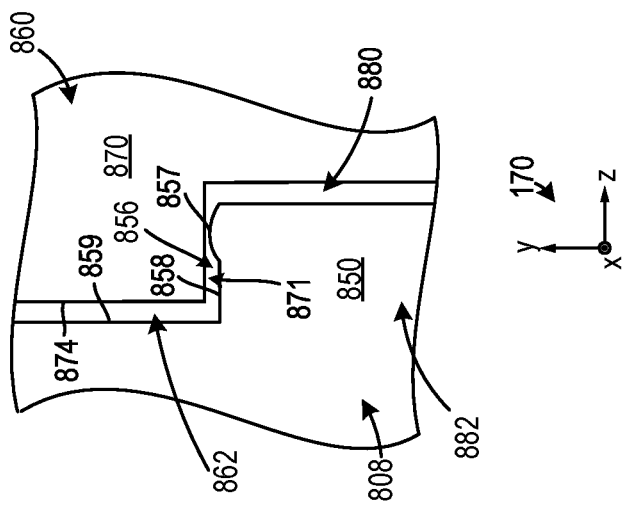
Figure 8D:
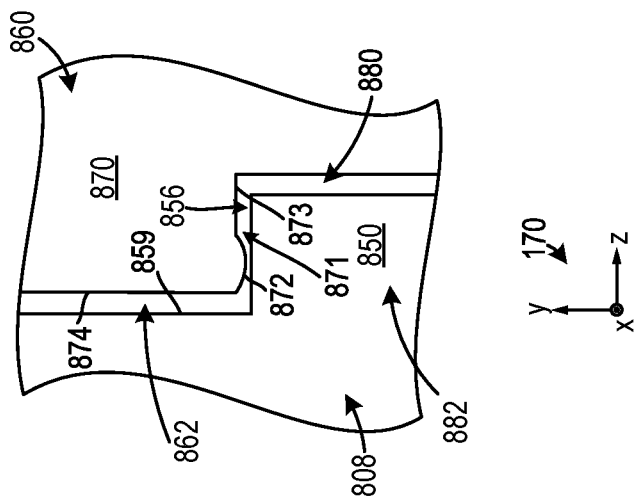
Figure 8G:
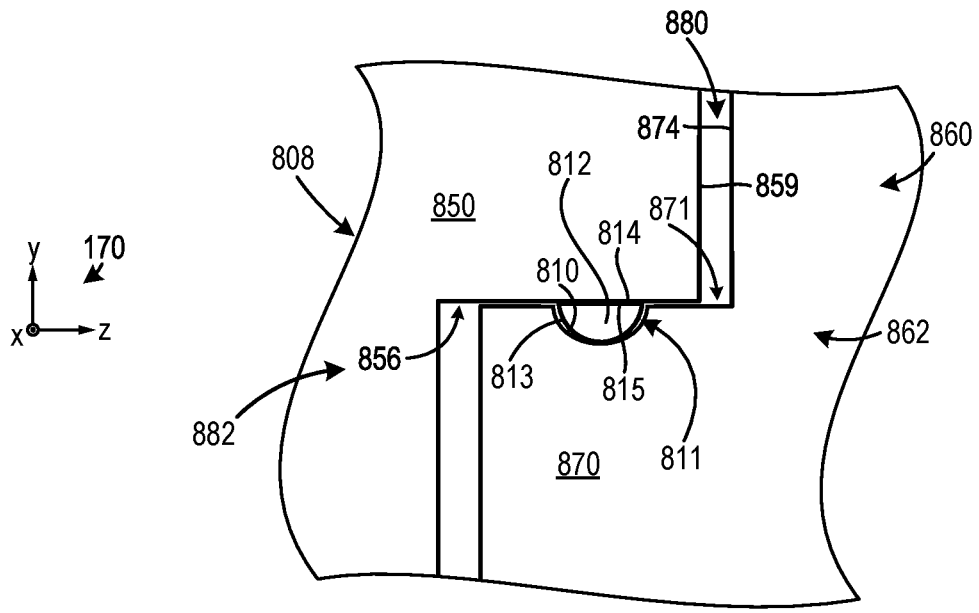
Figures 8H, 8I:
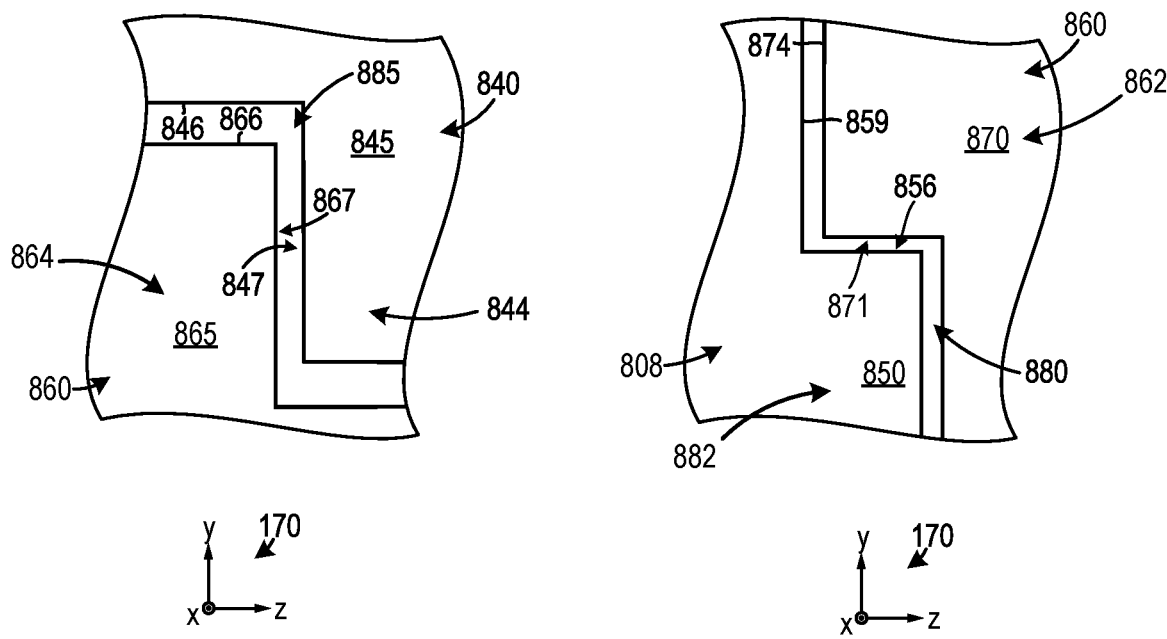

Turning to FIGS. 8D-8F and 8I, examples of an interface between mating horizontal steps of a grounding plate 860 and a housing 808 are depicted. The steps shown in FIGS. 8D-8F and 8I may be included in the horizontal steps shown in FIG. 7B, such that the interface 880 shown in FIGS. 8D-8F and 8I may be included in the interface 280 between the grounding plate 260 and housing 208, shown in FIGS. 4, 6 and 7B. As such, a horizontal step 870 on an outer stepped splined surface 862 of the grounding plate 860 may include a first (e.g., horizontal) side 871 and a second (e.g., vertical) side 874. Further, a horizontal step 850 on an inner stepped splined surface 882 of the housing 808 may include a first (e.g., horizontal) side 856 and a second (e.g., vertical) side 859. FIG. 8D illustrates the first side 871 of the horizontal step 870 on the grounding plate 860 may include a curved section 872 and a flat section 873, while the first side 856 of the horizontal step 850 on the housing 808 may include a continuous flat section. FIG. 8E depicts a second example where the first side 871 of the horizontal step 870 on the grounding plate 860 may include a continuous flat section, and the first side 856 of the horizontal step 850 on the housing 808 may include a curved section 857 and a flat section 858. FIG. 8F depicts a third arrangement, where both of the first sides 871, 856 of the horizontal steps 870, 850, respectively, include the curved sections 872, 857, respectively. In any of the examples shown in FIGS. 8D-8F, curved sections 872 and/or 857 may each have a curved profile, such as an elliptical or involute profile. Further, the curved sections 872 and/or 857 may be positive (e.g., convex) curved sections extending from the first side 871 or 856, respectively, and having a radius of curvature. However, in different examples, the use of other curved profiles has been contemplated, in different examples.

Continuing with FIGS. 8D-8F, a curved section 872 on a horizontal step 870 of the grounding plate 860 may be provided at an outer end portion of the first side 871, with respect to a central vertical plane extending through the grounding plate 860, so as to be located away from the central vertical plane with respect to the flat section 873 provided at an inner end portion of the first side 871, adjacent to the curved section 872. Further, a curved section 857 on a horizontal step 850 of the housing may be provided at an inner end portion of the first side 856, with respect to a central vertical plane extending through the housing 808, so as to be located closer to the central vertical plane with respect to the flat section 858 provided at an outer end portion of the first side 856, adjacent to the curved section 857. For instance, for mating horizontal steps 870, 850 on the grounding plate 860 and housing 808, respectively, in a left quadrant of the interface 880, as illustrated in FIGS. 8D-8F, a curved section 872 on the first side 871 of the grounding plate horizontal step 870 may be positioned to the left of the flat section 873 (i.e., at an outer portion of the first side 871), and a curved section 857 on the first side 856 of the housing horizontal step 850 may be positioned to the right of the flat section 858 (i.e., at an inner portion of the first side 856). Conversely, for mating horizontal steps 870, 850 in a right quadrant, a curved section 872 on the first side 871 of the grounding plate horizontal step 870 may be positioned to the right of the flat section 873 (i.e., at an outer portion of the first side 871), and a curved section 857 on the first side 856 of the housing horizontal step 850 may be positioned to the left of the flat section 858 (i.e., at an inner portion of the first side 856). However, in other examples, any side(s) having a curved section may not include a flat section, such that the entirety of the second side includes a curved profile.

In the examples described herein referring to FIGS. 8D-8F, the inclusion of a curved surface on one or both of first sides 856, 871 of the horizontal steps 850, 870 of the housing 808 or grounding plate 860, respectively, may help to reduce edge loading at the interface 880 between the housing and the grounding plate when the components are under a torque load. However, in one example, to reduce cost and complexity associated with manufacturing of the components, the curved surface may be provided on one of the first side 856 of the horizontal steps 850 of the inner stepped splined surface 882 on the housing 808, or the first side 871 of the horizontal steps 870 of the outer stepped splined surface 862 of the grounding plate 860. In this example, a substantially flat surface may be provided on the other of the first side 856 of horizontal step 850 and first side 871 of horizontal step 870, such as, for instance, in the manner depicted in FIG. 8D. Further, FIG. 8I shows an embodiment of a stepped interface where the horizontal and vertical sides in the housing 808 and the grounding plate 860 have substantially planar profiles.

Referring to FIGS. 8A-8F, collectively, it will be understood that one or more curved surfaces may be included at some or all of the second sides 847, 867 of the vertical steps 865, 845 on the clutch sleeve 840 and the grounding plate 860, respectively, at the interface 885, and/or at some or all of the first sides 871, 856 of the horizontal steps 870, 850 on the grounding plate 860 and the housing 808, respectively, at the interface 880, in any of the manners described in FIGS. 8A-8F. In one example, each pair of mating steps may include the same type of curved profile. However, in other examples, different curved profiles may be provided at different pairs of mating steps. For instance, in one example, a curved profile on one step may have a width different from a curved profile on another one of the steps. In still other examples, some pairs of mating steps may include one or more curved profiles and flat profiles, while others may include a continuous flat profile. In this way, the curved profile may reduce edge loading at particular contact areas where excessive edge loading is expected to occur when the respective interface 885 or 880 is under a torque load during operation, thus reducing a chance of uneven wear and component degradation in the housing, grounding plate, and/or clutch sleeve.

Turning to FIG. 8G, another example of a stepped spline is shown. Specifically, FIG. 8G shows an example of an interface 880 between mating horizontal steps 870, 850 on outer and inner stepped splined surfaces 862, 882 of the grounding plate 860 and the housing 808, respectively. In some examples, the grounding plate 860 and the housing 808 may be made of a metal (e.g., aluminum, steel, etc.). In one example, the grounding plate 860 and the housing 808 may be made of the same metal, thus sharing similar material properties (e.g., hardness, yield strength, etc.). In other examples, however, the grounding plate 860 and the housing 808 may be made of different metal materials, thus having dissimilar material properties. For instance, the grounding plate 860 may be made of a ductile cast iron material, and the housing 808 may be made of aluminum. In such a scenario, the grounding plate 860 may, under certain conditions, degrade (e.g., deform) the housing 808 due to torque transmitted through the grounding plate 860 to the housing 808 at the interface 880. It may therefore be desired to reduce edge loading and contact stress at the interface 880, and/or at the interface 885, such as, for instance, by increasing the contact width at the interface via the configurations shown in FIG. 8G.

The horizontal step 870 of the grounding plate 860 is shown in FIG. 8G to include perpendicularly intersecting first and second sides 871, 874, respectively, and the horizontal step 850 on the housing 808 includes perpendicularly intersecting first and second sides 856, 859, respectively, similar to the configurations of horizontal steps 870 and 850 previously described with reference to FIGS. 8D-8F. As such, additional discussion of the general relative arrangement of the first and second sides of the steps is omitted for brevity.

The first side 871 of the horizontal step 870 on the outer stepped splined surface 862 of the grounding plate 860 may include a negative (e.g., concave) curved surface 810, defining a receptacle 811 in the first side 871. Further, a shoe 812 may be provided that slides along the first side 856 of the horizontal step 850 on the inner stepped splined surface 882. The shoe 812 may include a positive (e.g., convex) curved surface 813 corresponding to the negative curved surface 810 of the horizontal step 870. Further, the receptacle 811 defined by the negative curved surface 810 may have a radius that is slightly larger than the positive curved surface 813 of the shoe 812, such that the shoe 812 may be received in the receptacle 811 when the horizontal steps 850, 870 are engaged at interface 880. In some examples, the depth of the receptacle 811 (e.g., as defined between the first side 871 and a middle point of negative curved surface 810) may be designed so as to allow the negative curved surface 810 to push laterally against the positive curved surface 813 of the shoe 812, under certain loading conditions where the grounding plate 860 moves horizontally, without causing the shoe 812 to become wedged or jammed between the receptacle 811 and first side 856 as it moves. In one example, the shoe 812 may have a tapered end configuration or include other features to aid in aligning and positioning of the shoe while assembling the interface 880 between mating horizontal steps 870, 850 on outer and inner stepped splined surfaces 862, 882 of the grounding plate 860 and the housing 808.

In some cases, a small radial difference between the positive curved surface 813 of the shoe 812 and the negative curved surface 810 of the receptacle 811 may be desired, so as to allow the shoe 812 to pivot within the receptacle to find its equilibrium. Further, the space between the positive curved surface 813 and the negative curved surface 810 may be small enough to provide a contact width sufficient to reduce edge loading and contact stress at the interface 880. In other words, a smaller radial difference between the positive and negative curved surfaces 813, 810, respectively, provides a greater amount of contact width, thus offering a greater reduction in edge loading and contact stress at the interface 880 between the shoe curved surface 813 and the negative curved surface 810 of the receptacle 811.

In some examples, the shoe 812 may have a flat side 814, on an opposite side from a positive curved surface 813. As such, an additional contact area may be provided between the flat side 814 of the shoe 812 and a flat surface 815 of the first side 856 of the horizontal step 850. The additional contact area provides a greater amount of contact width, thus offering a greater reduction in contact stress at the interface 880 between the shoe flat side 814 of the shoe 812 and the flat surface of the first side 856 of the horizontal step 850, as compared to the positive (e.g., convex) curved sections against a flat surface as described previously in FIGS. 8A-8F. Furthermore, an attachment device may be used for retaining the shoe 812 in place in the grounding plate 860 receptacle 811 while assembling the interface 880 between mating horizontal steps 870, 850 on outer and inner stepped splined surfaces 862, 882 of the grounding plate 860 and the housing 808 respectively. Examples of a suitable attachment device may thus include retaining rings, pins, and other mating features. In one example, the shoe 812, grounding plate 860, or both, may further include protrusions, cuts, and/or cutouts to facilitate retention of the shoe 812. In some examples, the shoe 812 may be formed of a metal (e.g., a similar or different metal of the housing 808). As such, the shoe 812 may be formed by various processes, including, for instance, machining from a billet, casting, powdered metal sintering, etc.

In one example, as illustrated in FIG. 8G, the shoe 812 may be provided on all of the horizontal steps 870 of the outer stepped splined surface 862 on the grounding plate 860, so as to be provided in the four quadrants of the housing 808. In some cases, the same number of shoes may be provided in each quadrant. However, in some cases, opposing quadrants may have an equal number of shoes, while the adjacent quadrants may have a greater or lesser number of shoes. For instance, a quadrant handling counterclockwise torque from the grounding plate 860 may have more or less shoes than a quadrant handling clockwise torque from the grounding plate 860. As such, the number of shoes provided on the outer stepped splined surface 862 may be determined based on the contact stress anticipated at the corresponding interface 880.

Further, while the shoe 812 is discussed as being provided on a horizontal step 870 on the grounding plate 860, other configurations including shoes have been envisioned, in different examples. For instance, converse to the depiction shown in FIG. 8G, the shoe 812, may be included on the first side 856 of the horizontal step 850 on the inner stepped splined surface 882 of the housing 808. As such, the negative curved surface 810, and thus the receptacle 811, may be provided on a first side 856 of the horizontal step 850 on the inner stepped splined surface 882 of the housing 808. In other examples, the shoes may be implemented on vertical steps (e.g., on a second side 847 of a vertical step 845 on the outer stepped splined surface 844 of the clutch sleeve 840, or on a second side 867 of the vertical step 865 on the inner stepped splined surface 864 of the grounding plate 860, at interface 885 depicted in FIGS. 8A-8C). Accordingly, in such examples, a receptacle 811 defined by the negative curved surface 810 may be provided on a corresponding side of a vertical step so as to receive (e.g., retain) the shoe 812. In still further examples, the shoes and receptacle may be provided, in any of the configurations described above, as an alternative to, or in conjunction with, any of the positive curved surface examples described with reference to FIGS. 8A-8F, so as to reduce contact stress and edge loading at a corresponding interface between either or both of the housing and the grounding plate or the grounding plate and the clutch sleeve.

FIGS. 9-10 illustrate another example of a grounding plate 960 mated at an outer and inner interface with a housing 908 and a clutch sleeve 940, respectively. An interface 980 is illustrated between the grounding plate 960 and the housing 908, and an interface 985 is illustrated between the grounding plate 960 and the clutch sleeve 940. Further, the clutch sleeve 940 is in splined engagement with an inner hub 990 at an interface 995. The interface 995 may include a tapered or involute splined surface 992 on an outer periphery of the inner hub 990 designed to mate with a tapered or involute splined surface 942 on an inner periphery of the clutch sleeve 940. Further, the interface 985 may be defined by an inner stepped splined surface 964 at an inner periphery of the grounding plate 960 including vertical steps 965 designed to selectively mate with vertical steps 945 of an outer stepped splined surface 944 at an outer periphery of the clutch sleeve 940.

The interfaces 995 and 985 may be substantially identical to the interfaces 295 and 285, respectively, described herein with relation to FIGS. 3B-8G, and repeated discussion of the tapered (or involute) spline and vertical stepped spline interfaces will be omitted for brevity. Thus, the vertical stepped splined interface 995 may allow for some vertical movement and tilting of the clutch sleeve 940 within the grounding plate 960 which may increase the ability of the clutch sleeve to axially translate therein, and, in conjunction with the tapered splined interface 995 radially positioning the clutch sleeve 940 about the inner hub 990, may further allow the clutch sleeve 940 to find its equilibrium, to reduce the chance of binding of the components.

The grounding plate 960 illustrated in FIGS. 9 and 10 may include an outer splined engagement surface 962 designed to mate with an inner splined engagement surface 982 of the housing 908 at an interface 980, in addition to the aforementioned inner stepped splined surface 964 designed to mate with the outer stepped splined surface 944 of the clutch sleeve 940 at interface 985. The outer splined engagement surface 962 may include involute splines 963 positioned about an outer periphery of the grounding plate 960. Similarly, the inner splined engagement surface 982 of the housing 908 may include corresponding involute splines 983 radially positioned about an inner periphery of the housing 908. In some examples, the involute splines 963, 983 may be provided along the entire outer or inner periphery of the grounding plate 960 and housing 908, respectively. However, in other examples, the involute splines 963, 983 may be provided in non-contiguous segments, separated by non-splined circumferential segments. In some cases, the segments of involute splines 963, 983 provided on the grounding plate 960 or the housing 908, respectively, may have equal or non-equal lengths, and may have equal or non-equal numbers of involute splines accordingly.

In the illustrated example, the involute splines 963 of the outer splined engagement surface 962 are provided in three segments 910, 920, and 930 on the grounding plate 960, as indicated in FIG. 10. However, in other examples, a different number of segments (e.g., two segments, four segments, etc.) of involute splines 963 may be provided. In some examples, the housing 908 may have a similar number of segments of involute splines 983 corresponding to the number of segments of involute splines 963 on the grounding plate 960, though other examples have been contemplated where different numbers of segments of involute splines 983, 963 are provided on the housing 908 and the grounding plate 960, respectively. Further, the segments of involute splines 963, 983 on the grounding plate 960 and the housing 908 may be radially aligned to increase the effectiveness and load distribution of the splined engagement.

However, in different examples, other arrangements having radially offset segments of the involute splines 963, 983 have been envisioned.

The inclusion of involute splines at the interface 980 between the grounding plate 960 and the housing 908 may restrict horizontal and vertical movement of the grounding plate 960 within the housing 908, and may further restrict rotation about a vertical axis (e.g., y-axis) and a horizontal axis (e.g., z-axis). This may, in turn, allow for a secure, stable engagement between the housing 908 and the grounding plate 960 to maintain a desired position of the grounding plate 960. However, in some cases, such a configuration may constrain the assembly, particularly when some horizontal positional tolerance of the grounding plate 960 is desired to accommodate radial positional tolerance stack-up within the assembly to allow the clutch sleeve 940 to find its operating center.

In still other examples, the grounding plate 960 may be positioned vertically in the housing 908 via dowel pins, shoulder screws, or similar means. In one example, three dowel pins, separated by selected angles may be used to attach the grounding plate to the housing, though other numbers of dowel pins have been envisioned. The dowel pins may axially extend through an inner periphery of the housing 908 into the outer periphery of the grounding plate 960 through horizontally slotted holes, thus attaching the grounding plate 960 to the housing 908 at a desired vertical position. In some examples, the use of dowel pins may allow for some horizontal movement of the grounding plate 960 with respect to the housing 908 in a horizontal plane, providing some positional tolerance.

FIGS. 11 and 12 illustrate another example for positioning a grounding plate 1160 with respect to a housing 1108. In this example, the grounding plate 1160 may include an outer engagement surface 1162 designed to mate with an inner engagement surface 1109 of the housing 1108 at an interface 1180. The outer surface 1162 and the inner surface 1109 may include any of the splined engagement configurations described herein, such as the horizontal stepped splined interface or the involute splined interface, or, in some cases, may include a non-splined surface. Similarly, there may be an inner engagement surface of the grounding plate 1160 and the housing 1108. The rear side surface of the housing 1108 may be a step in the housing or a retaining ring groove for the retaining ring 1110.

As shown in FIG. 11, two retaining rings 1110, 1120 may be provided on opposing axial sides of the grounding plate 1160 along the x-axis. The retaining rings may be provided at or near the inner engagement surface 1109 of the housing 1108, extending inwardly towards the grounding plate 1160. In one example, the outer engagement surface 1162 of the grounding plate 1160 may include a splined surface. The splined surface extends outward from a main body of the grounding plate 1160 (e.g., similar to the outer stepped splined surface 262 of grounding plate 260 shown in FIG. 4). Further, the retaining ring 1110 may be positioned on one side of the outwardly extending splined surface, while retaining ring 1120 may be positioned on the other axial side of the outwardly extending splined surface, so as to maintain an axial position of the grounding plate 1160 with respect to the housing 1108. FIG. 12 further illustrates the retaining ring 1120, shown in front of the outer engagement surface 1162 of the grounding plate 1160, which is depicted via a dashed line to represent its position behind retaining ring 1120. Thus, with the retaining ring 1120 disposed on a front side of the grounding plate 1160, it will be understood that the retaining ring 1110 may be disposed on a rear side of the grounding plate 1160, positioned coaxially with the retaining ring 1120. In this way, the grounding plate 1160 may be axially captured in a simple, cost-effective manner, while allowing for a targeted amount of the grounding plate movement in a horizontal direction (e.g., along the z-axis), if wanted. Axially capturing the grounding plate 1160 constrains the ability of the grounding plate to tilt about the y-axis, removing a degree of freedom. In some instances, the grounding plate's tilt ability about the y-axis could be regained by increasing the clearance between the retaining rings 1110 and 1120 with the inner and outer engagement surfaces 1109 and 1162. In some instances, a wave spring may be added between retaining rings 1110 and 1120, and the inner and outer engagement surfaces 1109 and 1162 respectively, to allow tilt ability of the grounding plate 1160 about the y-axis while reducing axial backlash of the grounding plate 1160 between retaining rings 1110 and 1120. The horizontal positional tolerance may further allow for positioning of a clutch sleeve 1140 engaged with the grounding plate 1160 at an interface 1185, which may allow for the clutch sleeve 1140 to find its equilibrium (e.g., intended operating center along the axis of rotation) to reduce the chance of binding of the components.

FIG. 13 shows a table 1300 depicting how various degrees of freedom of a sliding sleeve in a clutch are restricted or, in some cases, over-constrained due to various engagement configurations between the sleeve and a grounding plate and between a grounding plate and a housing, some of which may be similar to other examples described herein with relation to FIGS. 2-12. However, it will be understood that the configurations described with reference to the table 1300 are representative of different use-case examples.

Example configurations are indicated in the rows of the table 1300, including first through fourth examples 1310-1340. Further, six degrees of freedom (DOF) of a clutch sleeve and/or a grounding plate corresponding to translation and rotation about x, y and z axes are considered for each example. The x, y, and z axes described with relation to FIG. 13 may be the same as x, y, and z axes of the axis system 170 shown in FIGS. 2-12. As such, the x-axis may be a longitudinal axis (e.g., horizontal axis extending through a longitudinal axis of a clutch sleeve, grounding plate, and/or housing), the z-axis may be a lateral axis (e.g., a horizontal axis oriented normally to the longitudinal axis), and the y-axis may be a vertical axis (e.g., parallel to a gravitational axis).

The first example 1310 corresponds to a previously known configuration wherein a clutch sleeve and a grounding plate both include involute splines at their respective outer diameters. The involute splines of the clutch sleeve may be designed to mate with an inner surface of the grounding plate, and the involute splines of the grounding plate may be designed to mate with an inner surface of a housing. In this example, one sliding sleeve DOF is provided without restriction (i.e., axial displacement along the x-axis), while five of six sliding sleeve DOF are restricted: axial displacement along the z-axis, vertical displacement along the y-axis, torsional reaction about the x-axis, a binding moment about the y-axis, and a binding moment about the z-axis. In some cases, some of the restricted DOF may be excessively restricted, i.e., over-constrained. These over-constraints may be recognized in: the axial displacement along the z-axis, the vertical displacement along the y-axis, the binding moment about the y-axis, and the binding moment about the z-axis. Further, these over-constraints may cause binding issues, where the clutch sleeve may become jammed within the grounding plate, hindering its ability to translate axially in a desired manner. Thus, each of the examples 1320-1340 may address over-constraints by either eliminating the restriction entirely or eliminating the over-constraint.

In the second example 1320, the clutch sleeve includes a vertical stepped spline at its outer diameter for mating with a vertical stepped spline on an inner diameter of the grounding plate. The grounding plate outer diameter and housing inner diameter include involute splines. Thus, it will be understood that example 1320 may be similar to the configuration of clutch sleeve 940 and grounding plate 960 discussed with reference to FIGS. 9-10. In the second example 1320, two over-constraints present in first example 1310 may be eliminated. However, three of the six sliding sleeve DOF: axial displacement along the z-axis, torsional reaction about the x-axis, and a binding moment about the y-axis) may remain restricted and/or over-constrained, while three DOF: axial displacement along the x-axis, vertical displacement along the y-axis, and a binding moment about the z-axis, may still be provided without restriction.

In the third example 1330, the grounding plate may include horizontal stepped splines at an outer diameter thereof, which may be similar to the configuration of the grounding plate 260 described with reference to FIG. 7B. The sliding sleeve outer diameter and grounding plate inner diameter include involute splines. The horizontal stepped-spline configuration of the fourth example 1340 may restrict and/or over-constrain three of the six sliding sleeve DOF: vertical displacement along the y-axis, torsional reaction about the x-axis, and the binding moment about the z-axis. Thus, three of the six DOF may be provided without restriction: axial displacement along the x-axis, axial displacement along the z-axis, and the binding moment about the y-axis.

In the fourth example 1340, the clutch sleeve may include a vertical stepped spline at its outer diameter, and the grounding plate may include a horizontal stepped spline at its outer diameter. As such, it will be understood that the configuration of the fourth example 1340 may be substantially similar to the configuration described with reference to FIGS. 2-6 (e.g., including the clutch sleeve 240 having vertical steps 245 designed to mate with the grounding plate 260 at interface 285, and the grounding plate 260 having horizontal steps 270 designed to mate with the housing). However, in some cases, the fourth example 1340 may include a different clutch sleeve and grounding plate having vertical and horizontal steps, respectively, along their respective outer diameters. Further, the fourth example 1340 may include the grounding plate retaining rings 1110 and 1120 used for positioning a grounding plate with respect to a housing as described in FIGS. 11-12.

The fourth example 1340 may provide four DOF without restriction: axial displacement along the x-axis, axial displacement along the z-axis, vertical displacement along the y-axis, and the binding moment about the z-axis. Thus, the other two of the six DOF may be restricted. Specifically, the torsional reaction about the x-axis may be restricted, and the binding moment about the y-axis may be restricted. However, by eliminating many of the restrictions and/or over-constraints observed in previous examples, and particularly by providing the binding moment about the z-axis without restriction, the combined vertical and horizontal step configuration of the fourth example 1340 may reduce a chance of binding of the clutch sleeve and/or grounding plate, when compared to previous examples.

Although the aforementioned examples describe a grounding assembly which may include a horizontal stepped splined interface between a grounding plate and a housing, and a vertical stepped splined interface between the grounding plate and a clutch sleeve, other examples have been envisioned where a horizontal stepped splined interface may be provided between the grounding plate and the clutch sleeve, and a vertical stepped splined surface may be provided between the housing and the grounding plate. In such an example, however, the grounding plate may have some vertical positional tolerance within the housing, which may lead to undesired weight distribution of the grounding plate carried by the clutch sleeve, in some cases. Further, although the various examples described herein refer to "vertical" and "horizontal" stepped splined interfaces comprising pluralities of "vertical" and "horizontal" steps, respectively, other examples for use in different applications may include stepped splined surfaces with a plurality of steps oriented at a different angle (e.g., an angle between the vertical and horizontal). In such cases, the application may involve another type of torque loading and/or external biasing force(s) other than gravity which may be adequately addressed via stepped surfaces oriented in this manner.

FIGS. 1-12 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a multi-speed electric powertrain system is provided that comprises a grounding plate including an outer interface coupled to a housing interface and an inner stepped splined interface designed to selectively mate with a clutch sleeve, wherein the inner stepped splined interface includes a plurality of steps that each include a first side that perpendicularly intersects a second side, and wherein the first side of each step in the inner stepped splined interface includes a clearance between the first side and a stepped surface of the clutch sleeve.

In another aspect, a method for operating a multi-speed electric powertrain is provided that comprises mechanically grounding a clutch sleeve via a grounding plate, wherein the grounding plate includes an outer interface coupled to a housing interface; and an inner stepped splined interface designed to selectively mate with the clutch sleeve, wherein the inner stepped splined interface includes a plurality of steps that each include a first side that perpendicularly intersects a second side, and wherein the first side of each step in the inner stepped splined interface includes a clearance between the first side and a stepped surface of the clutch sleeve.

In yet another aspect, a multi-speed electric axle system is provided that comprises a grounding plate including an outer splined interface comprising a plurality of stepped splines that are mated with a housing interface, and an inner splined interface including a plurality of stepped splines that are designed to mate with a clutch sleeve, wherein the outer splined interface includes a clearance on one side of each of the plurality of stepped splines, and wherein the inner splined interface includes a clearance on one side of each of the plurality of stepped splines.

In any of the aspects or combinations of the aspects, the outer interface may be a stepped splined interface that comprises a plurality of steps that each include a first side that perpendicularly intersects a second side and the first side of each step in the outer interface may include a clearance between the first side and a stepped surface of the housing interface.

In any of the aspects or combinations of the aspects, the first side of the one or more of the plurality of steps may include a curved profile.

In any of the aspects or combinations of the aspects, the curved profile may be an elliptical or involute shape.

In any of the aspects or combinations of the aspects, the plurality of steps may have varying widths.

In any of the aspects or combinations of the aspects, a magnitude of the clearance may be greater than or equal to a positional tolerance stack of a clutch assembly that includes the clutch sleeve.

In any of the aspects or combinations of the aspects, the clearance between the first side of the inner stepped splined surface and the stepped surface of the clutch sleeve may vary between the plurality of steps in the inner stepped splined surface.

In any of the aspects or combinations of the aspects, one or more dowel pins may be included for attaching the outer interface of the grounding plate to the housing interface.

In any of the aspects or combinations of the aspects, a pair of retaining rings may be included that axially capture the grounding plate.

In any of the aspects or combinations of the aspects, the plurality of steps in the inner stepped splined surface may be partitioned into quadrants.

In any of the aspects or combinations of the aspects, an inner hub may be designed to selectively couple to the clutch sleeve.

In any of the aspects or combinations of the aspects, the clutch sleeve may be mechanically coupled to a gear, or a carrier in a planetary gearset.

In any of the aspects or combinations of the aspects, the multi-speed electric powertrain may be in one of a plurality of drive gears while the clutch sleeve is mechanically grounded.

In any of the aspects or combinations of the aspects, the clearance in the outer splined interface may be a horizontal clearance, wherein the clearance in the inner splined surface may be a vertical clearance.

In any of the aspects or combinations of the aspects, the outer splined surface may include a flank gap between a curved surface and the housing interface, wherein the flank gap may sequentially decrease.

In any of the aspects or combinations of the aspects, the plurality of stepped splines in the outer splined interface and the plurality of stepped splines in the inner splined interface may each include a first side that perpendicularly intersects a second side.

In any of the aspects or combinations of the aspects, the first side or the second side of one or more of the plurality of stepped splines in the outer or inner splined interface may include a curved surface adjacent to a stepped surface.

In any of the aspects or combinations of the aspects, the clutch sleeve may be designed to selectively ground one gear, or one carrier in a planetary assembly.

In any of the aspects or combinations of the aspects, the outer stepped splined interface may include mated convex and concave surfaces.

In any of the aspects or combinations of the aspects, the multi-speed electric powertrain system may further comprise a shoe including: a flat surface adjacent to a stepped surface in the outer or inner (stepped) splined interface; and a convex surface mated in a concave receptacle.

In any of the aspects or combinations of the aspects, the outer and inner splined interfaces may each include a flank gap between a curved surface and the housing interface and the clutch sleeve, respectively and wherein the flank gaps may sequentially decrease.

In another representation, a multi-speed gearbox is provided that includes a planetary gearset and a clutch with a sleeve designed to axially engage and disengage at least a first gear and a carrier in the planetary gearset in different positions, wherein during clutch sleeve engagement of the first gear or carrier the sleeve is grounded via a plate with stepped contours that have gaps, wherein the gaps permit horizontal and vertical movement of the sleeve with regard to the plate.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

As used herein, the terms "substantially" and "approximately" are construed to mean plus or minus five percent of the range unless otherwise specified.

It will be appreciated that the configurations and routines disclosed herein are exemplary in nature, and that these specific embodiments are not to be considered in a limiting sense, because numerous variations are possible. For example, the above technology can be applied to a variety of vehicles such as vehicles with hybrid electric powertrains, combustion engine powertrains, electric powertrains, and the like. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

Further, it will be appreciated that the configurations disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A multi-speed electric powertrain system, comprising:
a grounding plate designed to mechanically ground a clutch sleeve and prevent rotation thereof, wherein the grounding plate includes:
an outer interface coupled to a housing interface; and
an inner stepped splined interface designed to selectively mate with the clutch sleeve;
wherein the inner stepped splined interface includes a plurality of steps that each include a first side that perpendicularly intersects a second side at an angle of approximately 90 degrees;
wherein the first side and the second side are not radially aligned; and
wherein the first side of each step in the inner stepped splined interface includes a clearance between the first side and a stepped surface of the clutch sleeve.

2. The multi-speed electric powertrain system of claim 1, wherein the outer interface is a stepped splined interface that comprises a plurality of steps that each include a first side that perpendicularly intersects a second side and wherein the first side of each step in the outer interface includes a clearance between the first side and a stepped surface of the housing interface.

3. The multi-speed electric powertrain system of claim 2, further comprising a shoe including:
a flat surface adjacent to a stepped surface in the outer or inner stepped splined interface; and
a convex surface mated in a concave receptacle.

4. The multi-speed electric powertrain system of claim 1, wherein the first side of one or more of the plurality of steps includes a curved profile.

5. The multi-speed electric powertrain system of claim 4, wherein the curved profile is an elliptical or involute shape.

6. The multi-speed electric powertrain system of claim 1, wherein the plurality of steps have varying widths.

7. The multi-speed electric powertrain system of claim 1, wherein a magnitude of the clearance is greater than or equal to a component of a positional tolerance stack-up of a clutch assembly that includes the clutch sleeve.

8. The multi-speed electric powertrain system of claim 1, wherein the clearance between the first side of the inner stepped splined interface and the stepped surface of the clutch sleeve varies between the plurality of steps in the inner stepped splined interface.

9. The multi-speed electric powertrain system of claim 1, further comprising one or more dowel pins attaching the outer interface of the grounding plate to the housing interface.

10. The multi-speed electric powertrain system of claim 1, further comprising a pair of retaining rings that axially capture the grounding plate.

11. The multi-speed electric powertrain system of claim 1, wherein the plurality of steps in the inner stepped splined interface are partitioned into quadrants.

12. A method for operating a multi-speed electric powertrain, comprising:
mechanically grounding a clutch sleeve via a grounding plate to prevent rotation of the clutch sleeve;
wherein the grounding plate includes:
an outer interface coupled to a housing interface; and
an inner stepped splined interface designed to selectively mate with the clutch sleeve;
wherein the inner stepped splined interface includes a plurality of steps that each include a first horizontally aligned side that perpendicularly intersects a second vertically aligned side; and
wherein the first horizontally aligned side of each step in the inner stepped splined interface includes a clearance between the first horizontally aligned side and a stepped surface of the clutch sleeve.

13. The method of claim 12, wherein the clutch sleeve is mechanically coupled to a gear or carrier in a planetary gearset.

14. The method of claim 12, wherein the multi-speed electric powertrain is in one of a plurality of drive gears while the clutch sleeve is mechanically grounded.

15. A multi-speed electric axle system, comprising:
a grounding plate including:
an outer splined interface comprising a plurality of stepped splines that are mated with a housing interface; and
an inner splined interface including a plurality of stepped splines that are designed to mate with a clutch sleeve;
wherein the outer splined interface includes a clearance on one side of each of the plurality of stepped splines;
wherein the inner splined interface includes a clearance on one side of each of the plurality of stepped splines; and
wherein the clearance in the outer splined interface is a horizontal clearance and wherein the clearance in the inner splined interface is a vertical clearance.

16. The multi-speed electric axle system of claim 15, wherein the outer and inner splined interfaces each include a flank gap between a curved surface and the housing interface and the clutch sleeve, respectively and wherein the flank gaps sequentially decrease.

17. The multi-speed electric axle system of claim 15, wherein the plurality of stepped splines in the outer splined interface and the plurality of stepped splines in the inner splined interface each include a first side that perpendicularly intersects a second side.

18. The multi-speed electric axle system of claim 17, wherein the first side or the second side of one or more of the plurality of stepped splines in the outer and inner splined interfaces includes a curved surface adjacent to a stepped surface.

19. The multi-speed electric axle system of claim 15, further comprising a shoe including:
- a flat surface adjacent to a stepped surface in the outer or inner splined interface; and
- a convex surface mated in a concave receptacle.

* * * * *